(12) United States Patent
Mittricker et al.

(10) Patent No.: US 9,353,940 B2
(45) Date of Patent: May 31, 2016

(54) COMBUSTOR SYSTEMS AND COMBUSTION BURNERS FOR COMBUSTING A FUEL

(75) Inventors: Franklin F. Mittricker, Jamul, CA (US); Dennis M. O'Dea, Somerset, NJ (US); Harry W. Deckman, Clinton, NJ (US); Chad C. Rasmussen, Houston, TX (US); David R. Noble, Marietta, GA (US); Jerry M. Seitzman, Atlanta, GA (US); Timothy C. Lieuwen, Atlanta, GA (US); Sulabh K. Dhanuka, Houston, TX (US); Richard Huntington, Houston, TX (US)

(73) Assignees: ExxonMobil Upstream Research Company, Houston, TX (US); Georgia Tech Research Corporation, Atlanta, GA (US)

( * ) Notice: Subject to any disclaimer, the term of this patent is extended or adjusted under 35 U.S.C. 154(b) by 1073 days.

(21) Appl. No.: 13/376,277

(22) PCT Filed: Jun. 3, 2010

(86) PCT No.: PCT/US2010/037325
§ 371 (c)(1),
(2), (4) Date: Feb. 17, 2012

(87) PCT Pub. No.: WO2010/141777
PCT Pub. Date: Dec. 9, 2010

(65) Prior Publication Data
US 2012/0131925 A1 May 31, 2012

Related U.S. Application Data

(60) Provisional application No. 61/184,584, filed on Jun. 5, 2009.

(51) Int. Cl.
*F23C 9/00* (2006.01)
*F23L 7/00* (2006.01)
(Continued)

(52) U.S. Cl.
CPC . *F23C 9/00* (2013.01); *F23C 9/006* (2013.01); *F23L 7/007* (2013.01); *F23N 5/006* (2013.01);
(Continued)

(58) Field of Classification Search
CPC ........ F23C 9/00; F23C 9/006; F23C 2202/30; F23C 2202/10; F23C 2202/50; F23R 3/06; F23L 7/007; F23L 2900/07001
USPC .............. 60/39.52, 39.461, 39.463, 737, 752, 60/772
See application file for complete search history.

(56) References Cited

U.S. PATENT DOCUMENTS 3,705,492 A 12/1972 Vickers ........................ 60/39.51
3,841,382 A 10/1974 Gravis, III et al. .......... 159/16 R
(Continued)

FOREIGN PATENT DOCUMENTS

CA 2231749 3/1998 ................ F23C 9/00
CA 2550675 7/2005 ................ F02C 3/34
(Continued)

OTHER PUBLICATIONS

PCT/US2010/037325 International Search Report dated Aug. 16, 2010.
(Continued)

*Primary Examiner* — Lorne Meade
(74) *Attorney, Agent, or Firm* — Edmonds & Nolte, P.C.

(57) ABSTRACT

Systems and methods for an oxy-fuel type combustion reaction are provided. In one or more embodiments, a combustion system can include at least two mixing zones, where a first mixing zone at least partially mixes oxygen and carbon dioxide to produce a first mixture and a second mixing zone at least partially mixes the first mixture with a fuel to produce a second mixture. The combustion system can also include a combustion zone configured to combust the second mixture to produce a combustion product. In one or more embodiments, the first mixture can have a spatially varied ratio of oxygen-to-carbon dioxide configured to generate a hot zone in the combustion zone to increase flame stability in the combustion zone.

12 Claims, 18 Drawing Sheets

(51) Int. Cl.
*F23N 5/00* (2006.01)
*F23R 3/06* (2006.01)

(52) U.S. Cl.
CPC ............. *F23R 3/06* (2013.01); *F23C 2202/10* (2013.01); *F23C 2202/50* (2013.01); *F23L 2900/07001* (2013.01); *Y02E 20/16* (2013.01); *Y02E 20/322* (2013.01); *Y02E 20/328* (2013.01); *Y02E 20/344* (2013.01)

(56) References Cited

U.S. PATENT DOCUMENTS

| | | | |
|---|---|---|---|
| 4,043,395 A | 8/1977 | Every et al. ................... 166/263 |
| 4,050,239 A | 9/1977 | Kappler et al. ............... 60/39.51 |
| 4,160,640 A | 7/1979 | Maev et al. ........................ 431/9 |
| 4,171,349 A | 10/1979 | Cucuiat et al. ................. 423/574 |
| 4,271,664 A | 6/1981 | Earnest ........................ 60/39.18 |
| 4,344,486 A | 8/1982 | Parrish ........................... 166/272 |
| 4,380,429 A * | 4/1983 | LaHaye et al. ................. 431/115 |
| 4,414,334 A | 11/1983 | Hitzman ........................ 435/262 |
| 4,434,613 A | 3/1984 | Stahl ............................... 60/39.7 |
| 4,498,289 A | 2/1985 | Osgerby ........................ 60/39.52 |
| 4,528,811 A * | 7/1985 | Stahl ............................... 60/784 |
| 4,708,638 A * | 11/1987 | Brazier et al. ................. 431/116 |
| 4,753,666 A | 6/1988 | Pastor et al. ........................ 62/24 |
| 4,762,543 A | 8/1988 | Pantermuehl et al. ........... 62/28 |
| 4,858,428 A | 8/1989 | Paul .............................. 60/39.17 |
| 4,895,710 A | 1/1990 | Hartmann et al. ............. 423/351 |
| 4,976,100 A | 12/1990 | Lee ............................... 60/39.02 |
| 5,014,785 A | 5/1991 | Puri et al. ...................... 166/263 |
| 5,069,029 A | 12/1991 | Kuroda et al. ................. 60/39.06 |
| 5,085,274 A | 2/1992 | Puri et al. ...................... 166/252 |
| 5,123,248 A | 6/1992 | Monty et al. .................... 60/740 |
| 5,141,049 A | 8/1992 | Larsen et al. .................. 165/133 |
| 5,147,111 A | 9/1992 | Montgomery ................... 299/16 |
| 5,332,036 A | 7/1994 | Shirley et al. ................. 166/268 |
| 5,345,756 A | 9/1994 | Jahnke et al. .................. 60/39.02 |
| 5,349,812 A * | 9/1994 | Taniguchi et al. ............. 60/39.23 |
| 5,350,293 A | 9/1994 | Khinkis |
| 5,388,395 A | 2/1995 | Scharpf et al. ................ 60/39.02 |
| 5,402,847 A | 4/1995 | Wilson et al. ................. 166/263 |
| 5,444,971 A | 8/1995 | Holenberger ................. 60/39.02 |
| 5,490,378 A | 2/1996 | Berger et al. .................. 60/39.23 |
| 5,562,438 A * | 10/1996 | Gordon et al. ................. 431/115 |
| 5,566,756 A | 10/1996 | Chaback et al. .............. 166/263 |
| 5,724,805 A * | 3/1998 | Golomb et al. .................. 60/783 |
| 5,725,054 A | 3/1998 | Shayegi et al. ................ 166/263 |
| 5,901,547 A | 5/1999 | Smith et al. ................... 60/39.02 |
| 5,950,417 A * | 9/1999 | Robertson et al. ............... 60/776 |
| 5,968,349 A | 10/1999 | Duyvesteyn et al. ......... 208/390 |
| 6,082,093 A | 7/2000 | Greenwood et al. ......... 60/39.23 |
| 6,089,855 A | 7/2000 | Becker et al. ....................... 431/9 |
| 6,148,602 A | 11/2000 | Demetri ........................ 60/39.05 |
| 6,201,029 B1 | 3/2001 | Waycuilis ...................... 518/703 |
| 6,202,400 B1 | 3/2001 | Utamura et al. .............. 60/39.03 |
| 6,256,994 B1 | 7/2001 | Dillon ............................. 60/649 |
| 6,263,659 B1 | 7/2001 | Dillon ............................ 60/39.02 |
| 6,282,901 B1 | 9/2001 | Marin et al. ..................... 60/649 |
| 6,298,652 B1 | 10/2001 | Mittricker et al. ............. 60/39.02 |
| 6,298,654 B1 | 10/2001 | Vermes et al. ................. 60/39.02 |
| 6,298,664 B1 | 10/2001 | Asen et al. ....................... 60/649 |
| 6,332,313 B1 | 12/2001 | Willis et al. .................... 60/39.06 |
| 6,345,493 B1 | 2/2002 | Smith et al. ................... 60/39.02 |
| 6,374,594 B1 | 4/2002 | Kraft et al. .................... 60/39.37 |
| 6,389,814 B2 | 5/2002 | Viteri et al. ..................... 60/716 |
| 6,405,536 B1 | 6/2002 | Ho et al. ........................... 60/742 |
| 6,412,559 B1 | 7/2002 | Gunter et al. ................. 166/271 |
| 6,450,256 B2 | 9/2002 | Mones ...................... 166/250.01 |
| 6,477,859 B2 | 11/2002 | Wong et al. ..................... 62/617 |
| 6,508,209 B1 | 1/2003 | Collier ............................... 123/3 |
| 6,565,361 B2 * | 5/2003 | Jones et al. ........................ 438/6 |
| 6,598,402 B2 | 7/2003 | Kataoka et al. ................. 60/775 |
| 6,637,183 B2 | 10/2003 | Viteri et al. ................. 60/39.182 |
| 6,655,150 B1 | 12/2003 | Asen et al. ....................... 60/772 |
| 6,702,570 B2 | 3/2004 | Shah et al. ........................ 431/11 |
| 6,722,436 B2 | 4/2004 | Krill .............................. 166/303 |
| 6,735,949 B1 * | 5/2004 | Haynes et al. .................... 60/746 |
| 6,745,573 B2 | 6/2004 | Marin et al. ...................... 60/775 |
| 6,790,030 B2 | 9/2004 | Fischer et al. ...................... 431/8 |
| 6,907,737 B2 | 6/2005 | Mittricker et al. ............... 60/772 |
| 6,910,335 B2 | 6/2005 | Viteri et al. ...................... 60/786 |
| 6,945,029 B2 | 9/2005 | Viteri ............................ 60/39.17 |
| 7,043,920 B2 | 5/2006 | Viteri et al. ...................... 60/716 |
| 7,065,953 B1 | 6/2006 | Kopko ............................ 60/39.3 |
| 7,089,743 B2 | 8/2006 | Frutschi et al. .................. 60/772 |
| 7,124,589 B2 | 10/2006 | Neary ............................... 60/784 |
| 7,143,572 B2 | 12/2006 | Ooka et al. ................. 60/39.182 |
| 7,147,461 B2 | 12/2006 | Neary ................................ 431/5 |
| 7,264,466 B2 * | 9/2007 | Miller et al. ........................ 431/8 |
| 7,284,362 B2 | 10/2007 | Marin et al. ................ 60/39.182 |
| 7,305,831 B2 | 12/2007 | Carrea et al. ..................... 60/772 |
| 7,357,857 B2 | 4/2008 | Hart et al. ....................... 208/391 |
| 7,363,756 B2 | 4/2008 | Carrea et al. .................. 60/39.52 |
| 7,401,577 B2 | 7/2008 | Saucedo et al. .............. 122/448.1 |
| 7,472,550 B2 | 1/2009 | Lear et al. ..................... 62/238.3 |
| 7,481,275 B2 | 1/2009 | Olsvik et al. .................. 166/303 |
| 7,491,250 B2 | 2/2009 | Hershkowitz et al. ........ 48/198.7 |
| 7,503,178 B2 | 3/2009 | Bucker et al. .................... 60/774 |
| 7,516,626 B2 | 4/2009 | Brox et al. ....................... 62/643 |
| 7,523,603 B2 * | 4/2009 | Hagen et al. .................. 60/39.55 |
| 7,536,873 B2 | 5/2009 | Nohlen ............................ 62/644 |
| 7,559,977 B2 | 7/2009 | Fleischer et al. ................. 95/236 |
| 7,566,394 B2 | 7/2009 | Koseoglu ....................... 208/309 |
| 7,637,093 B2 | 12/2009 | Rao ............................... 60/39.52 |
| 7,650,744 B2 | 1/2010 | Varatharajan et al. ........ 60/39.12 |
| 7,654,320 B2 | 2/2010 | Payton .......................... 166/257 |
| 7,752,848 B2 | 7/2010 | Balan et al. ..................... 60/780 |
| 7,752,850 B2 | 7/2010 | Laster et al. .................... 60/794 |
| 7,762,084 B2 | 7/2010 | Martis et al. .................... 60/792 |
| 7,765,810 B2 | 8/2010 | Pfefferle ........................ 60/777 |
| 2001/0015061 A1 | 8/2001 | Viteri et al. ................. 60/39.161 |
| 2002/0036086 A1 | 3/2002 | Minkkinen et al. ........... 166/266 |
| 2002/0166323 A1 | 11/2002 | Marin et al. ...................... 60/775 |
| 2003/0000436 A1 | 1/2003 | Havlena ........................ 110/347 |
| 2003/0131582 A1 | 7/2003 | Anderson et al. ............. 60/39.55 |
| 2003/0134241 A1 | 7/2003 | Marin et al. ........................ 431/9 |
| 2003/0221409 A1 | 12/2003 | McGowan ..................... 60/39.17 |
| 2003/0235529 A1 | 12/2003 | Hershkowitz et al. ........ 423/652 |
| 2004/0128975 A1 | 7/2004 | Viteri ............................ 60/39.55 |
| 2004/0148941 A1 | 8/2004 | Wylie .............................. 60/772 |
| 2004/0154793 A1 | 8/2004 | Zapadinski .................... 166/256 |
| 2004/0170558 A1 | 9/2004 | Hershkowitz .................. 423/652 |
| 2004/0170559 A1 | 9/2004 | Hershkowitz et al. ........ 423/652 |
| 2004/0175326 A1 | 9/2004 | Hershkowitz et al. ........ 423/652 |
| 2004/0180973 A1 | 9/2004 | Hershkowitz .................. 518/703 |
| 2004/0191166 A1 | 9/2004 | Hershkowitz et al. ........ 423/652 |
| 2004/0206091 A1 | 10/2004 | Yee et al. .......................... 60/777 |
| 2004/0219079 A1 | 11/2004 | Hagen et al. .................. 422/194 |
| 2004/0241505 A1 | 12/2004 | Hershkowitz et al. .......... 429/17 |
| 2005/0022499 A1 | 2/2005 | Belokon et al. .............. 60/39.511 |
| 2005/0028529 A1 | 2/2005 | Bartlett et al. ................... 60/772 |
| 2005/0123874 A1 | 6/2005 | Abbasi et al. |
| 2005/0132713 A1 | 6/2005 | Neary ............................... 60/784 |
| 2005/0137269 A1 | 6/2005 | Hershkowitz et al. ........ 518/702 |
| 2005/0144961 A1 | 7/2005 | Colibaba-Evulet et al. ..... 60/780 |
| 2005/0154068 A1 | 7/2005 | Hershkowitz et al. ........ 518/703 |
| 2005/0186130 A1 | 8/2005 | Hughes et al. ................. 423/219 |
| 2005/0197267 A1 | 9/2005 | Zaki et al. ..................... 510/245 |
| 2005/0201929 A1 | 9/2005 | Hershkowitz et al. ........ 423/652 |
| 2005/0236602 A1 | 10/2005 | Viteri et al. .................... 252/372 |
| 2006/0005542 A1 | 1/2006 | Campbell et al. ................ 60/723 |
| 2006/0112696 A1 | 6/2006 | Lynghjem et al. ............... 60/772 |
| 2006/0127827 A1 | 6/2006 | Yoshida et al. .................... 431/8 |
| 2006/0183009 A1 | 8/2006 | Berlowitz et al. ............... 429/19 |
| 2006/0188760 A1 | 8/2006 | Hershkowitz et al. .......... 429/17 |
| 2006/0196812 A1 | 9/2006 | Beetge et al. .................. 208/435 |
| 2006/0231252 A1 | 10/2006 | Shaw et al. ................. 166/272.3 |
| 2006/0260290 A1 | 11/2006 | Rao .............................. 60/39.53 |
| 2007/0006565 A1 | 1/2007 | Fleischer et al. ................ 60/39.5 |
| 2007/0034171 A1 | 2/2007 | Griffin et al. ................ 122/479.1 |
| 2007/0044479 A1 | 3/2007 | Brandt et al. .................... 60/783 |
| 2007/0125063 A1 | 6/2007 | Evulat .......................... 60/39.15 |
| 2007/0130957 A1 | 6/2007 | Hoffmann et al. .............. 60/780 |
| 2007/0144747 A1 | 6/2007 | Steinberg ....................... 166/402 |

(56) References Cited

U.S. PATENT DOCUMENTS

| | | | | |
|---|---|---|---|---|
| 2007/0144940 | A1 | 6/2007 | Hershkowitz et al. | 208/107 |
| 2007/0178035 | A1 | 8/2007 | White et al. | 423/248 |
| 2007/0220864 | A1 | 9/2007 | Haugen | 60/286 |
| 2007/0227156 | A1 | 10/2007 | Saito et al. | 60/772 |
| 2007/0237696 | A1 | 10/2007 | Payton | 423/228 |
| 2007/0240425 | A1 | 10/2007 | Malavasi et al. | 60/775 |
| 2007/0245736 | A1 | 10/2007 | Barnicki | 60/670 |
| 2007/0249738 | A1 | 10/2007 | Haynes et al. | |
| 2007/0272201 | A1 | 11/2007 | Amano et al. | 123/295 |
| 2007/0295640 | A1 | 12/2007 | Tan et al. | 208/22 |
| 2008/0006561 | A1 | 1/2008 | Moran et al. | 208/45 |
| 2008/0010967 | A1 | 1/2008 | Griffin et al. | 60/39.182 |
| 2008/0016868 | A1 | 1/2008 | Ochs et al. | 60/668 |
| 2008/0038598 | A1 | 2/2008 | Berlowitz et al. | 429/17 |
| 2008/0066443 | A1 | 3/2008 | Frutschi et al. | 60/39.53 |
| 2008/0083226 | A1 | 4/2008 | Joshi et al. | 60/772 |
| 2008/0092539 | A1 | 4/2008 | Marshall et al. | 60/599 |
| 2008/0104938 | A1 | 5/2008 | Finkenrath et al. | 60/39.5 |
| 2008/0104939 | A1 | 5/2008 | Hoffmann et al. | 60/39.5 |
| 2008/0104958 | A1 | 5/2008 | Finkenrath et al. | 60/605.2 |
| 2008/0115495 | A1 | 5/2008 | Rising | 60/731 |
| 2008/0118310 | A1 | 5/2008 | Graham | 405/129.95 |
| 2008/0127632 | A1 | 6/2008 | Finkenrath et al. | 60/274 |
| 2008/0141643 | A1 | 6/2008 | Varatharajan et al. | 60/39.5 |
| 2008/0142409 | A1 | 6/2008 | Sankaranarayanan et al. | 208/62 |
| 2008/0155984 | A1 | 7/2008 | Liu et al. | 60/649 |
| 2008/0173584 | A1 | 7/2008 | White et al. | 210/656 |
| 2008/0275278 | A1 | 11/2008 | Clark | 585/240 |
| 2008/0290719 | A1 | 11/2008 | Kaminsky et al. | 299/3 |
| 2008/0302107 | A1 | 12/2008 | Fan et al. | 60/783 |
| 2008/0309087 | A1 | 12/2008 | Evulet et al. | 290/52 |
| 2008/0317651 | A1 | 12/2008 | Hooper et al. | 423/230 |
| 2009/0038247 | A1 | 2/2009 | Taylor et al. | 52/287.1 |
| 2009/0064653 | A1 | 3/2009 | Hagen et al. | 60/39.3 |
| 2009/0100754 | A1 | 4/2009 | Gil | 48/201 |
| 2009/0117024 | A1 | 5/2009 | Weedon et al. | 423/437.1 |
| 2009/0133400 | A1 | 5/2009 | Callas | 60/730 |
| 2009/0145127 | A1 | 6/2009 | Vollmer et al. | 60/618 |
| 2009/0193809 | A1 | 8/2009 | Schroder et al. | 60/762 |
| 2009/0194280 | A1 | 8/2009 | Gil et al. | 166/267 |
| 2009/0205334 | A1 | 8/2009 | Aljabari et al. | 60/605.2 |
| 2009/0218821 | A1 | 9/2009 | Elkady et al. | 290/52 |
| 2009/0235671 | A1 | 9/2009 | Rabovitser et al. | 60/806 |
| 2009/0241506 | A1 | 10/2009 | Nilsson | 60/39.24 |
| 2009/0250264 | A1 | 10/2009 | Dupriest | 175/42 |
| 2009/0284013 | A1 | 11/2009 | Anand et al. | 290/52 |
| 2009/0301054 | A1 | 12/2009 | Simpson et al. | 60/39.15 |
| 2009/0301099 | A1 | 12/2009 | Nigro | 60/775 |
| 2010/0018218 | A1 | 1/2010 | Riley et al. | 60/783 |
| 2010/0028142 | A1 | 2/2010 | Hashimoto et al. | 415/200 |
| 2010/0064855 | A1 | 3/2010 | Lanyi et al. | 75/458 |
| 2010/0077941 | A1 | 4/2010 | D'Agostini | 110/188 |
| 2010/0115960 | A1 | 5/2010 | Brautsch et al. | 60/772 |
| 2010/0126176 | A1 | 5/2010 | Kim | 60/748 |
| 2010/0162703 | A1 | 7/2010 | Li et al. | 60/670 |
| 2010/0180565 | A1 | 7/2010 | Draper | 60/39.52 |
| 2010/0310439 | A1 | 12/2010 | Brok et al. | 423/222 |
| 2010/0314136 | A1 | 12/2010 | Zubrin et al. | 166/402 |
| 2010/0326084 | A1 | 12/2010 | Anderson et al. | 60/775 |
| 2011/0000221 | A1 | 1/2011 | Minta et al. | 60/783 |
| 2011/0023488 | A1 | 2/2011 | Fong et al. | 60/659 |
| 2011/0027018 | A1 | 2/2011 | Baker et al. | 405/128.6 |
| 2011/0219777 | A1 | 9/2011 | Wijmans et al. | 60/772 |

FOREIGN PATENT DOCUMENTS

| | | | |
|---|---|---|---|
| CA | 2645450 | 9/2007 | C01G 1/00 |
| CA | 2614669 | 12/2008 | B03B 9/02 |
| EP | 0453059 | 6/1994 | F01K 23/06 |
| EP | 0654639 | 9/1998 | F23R 3/14 |
| GB | 2117053 | 2/1983 | F02C 3/22 |
| GB | 2397349 | 7/2004 | F02C 3/22 |
| WO | WO95/21683 | 8/1995 | B01D 53/14 |
| WO | WO97/07329 | 2/1997 | F02C 6/00 |
| WO | WO99/06674 | 2/1999 | F01K 23/10 |
| WO | WO99/63210 | 12/1999 | F02C 3/34 |
| WO | WO2005/064232 | 7/2005 | F23C 6/04 |
| WO | WO2006/107209 | 10/2006 | F01K 23/00 |
| WO | WO2007/068682 | 6/2007 | E21B 43/16 |
| WO | 2008/023986 | 2/2008 | |
| WO | 2008/074980 | 6/2008 | |
| WO | WO2008/142009 | 11/2008 | |
| WO | WO2008/155242 | 12/2008 | F02C 3/34 |
| WO | 2009/121008 | 10/2009 | |
| WO | WO2009/120779 | 10/2009 | F02B 17/00 |
| WO | WO2010/044958 | 4/2010 | F02C 9/00 |
| WO | WO2010/066048 | 6/2010 | F22B 1/22 |
| WO | WO2010/141777 | 12/2010 | F02C 9/00 |
| WO | WO2011/028322 | 3/2011 | E21B 43/40 |
| WO | WO2011/028356 | 3/2011 | F01K 13/00 |
| WO | WO2012/003076 | 1/2012 | F02C 7/08 |
| WO | WO2012/003077 | 1/2012 | F02C 6/00 |
| WO | WO2012/003078 | 1/2012 | F02C 3/34 |
| WO | WO2012/003079 | 1/2012 | F02C 3/34 |
| WO | WO2012/003080 | 1/2012 | F02C 6/00 |
| WO | WO2012/003489 | 1/2012 | F16K 3/28 |
| WO | WO2012/018457 | 2/2012 | F02C 3/20 |
| WO | WO2012/018458 | 2/2012 | F02C 3/00 |

OTHER PUBLICATIONS

Ditranto et al. "Combustion Instabilities in Sudden Expansion Oxy-Fuel Flames" in Combustion and Flame (2006) vol. 146, pp. 493-512.
Baukal in Industrialial Burners Handbook (2003) pp. 1-757.
Ahmed, S. et al. (1998) "Catalytic Partial Oxidation Reforming of Hydrocarbon Fuels," *1998 Fuel Cell Seminar*, Nov. 16-19, 1998, 7 pgs.
Anderson, R. E. (2006) "Durability and Reliability Demonstration of a Near-Zero-Emission Gas-Fired Power Plant," *California Energy Comm.*, CEC 500-2006-074, 80 pgs.
Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.
Bolland, O. et al. (1998) "Removal of $CO_2$ From Gas Turbine Power Plants Evaluation of Pre- and Postcombustion Methods," *SINTEF Group*, 1998, www.energy.sintef.no/publ/xergi/98/3/art-8engelsk.htm, 11 pgs.
BP Press Release (2006) "BP and Edison Mission Group Plan Major Hydrogen Power Project for California," Feburary 10, 2006, www.bp.com/hydrogenpower, 2 pgs.
Bryngelsson, M. et al. (2005) "Feasibility Study of CO2 Removal From Pressurized Flue Gas in a Fully Fired Combined Cycle—The Sargas Project," *KTH—Royal Institute of Technology, Dept. of Chemical Engineering and Technology*, 9 pgs.
Clark, Hal (2002) "Development of a Unique Gas Generator for a Non-Polluting Power Plant," *California Energy Commission Feasibility Analysis*, P500-02-011F, Mar. 2002, 42 pgs.
Defrate, L. A. et al. (1959) "Optimum Design of Ejector Using Digital Computers" *Chem. Eng. Prog. Symp. Ser.*, 55 ( 21) pp. 46.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Ertesvag, I. S. et al. (2005) "Exergy Analysis of a Gas-Turbin Combined-Cycle Power Plant With Precombustion $CO_2$ Capture," Elsivier, 2004, pp. 5-39.
Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems*, Inc. 6 pgs.
Reeves, S. R. (2001) "Geological Sequestration of $CO_2$ in Deep, Unmineable Coalbeds: An Integrated Research and Commercial-Scale Field Demonstration Project," *SPE* 71749,10 pgs.
Reeves, S. R. (2003) "Enhanced Coalbed Methane Recovery," *SPE* 101466-DL, 8 pgs.
Richards, G. A. et al. (2001) "Advanced Steam Generators," *National Energy Technology Laboratory*, 7 pgs.

(56) References Cited

OTHER PUBLICATIONS

Snarheim, D. et al. (2006) "Control Design for a Gas Turbine Cycle With $CO_2$ Capture Capabilities," *Modeling, Identification and Control*, vol. 00, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.

vanHemert, P. et al. (2006) "Adsorption of Carbon Dioxide and a Hydrogen-Carbon Dioxide Mixture," *Intn'l Coalbed Methane Symposium* (Tuscaloosa, AL) *Paper* 0615, 9 pgs.

Zhu, J. et al. (2002) "Recovery of Coalbed Methane by Gas Injection," *SPE* 75255, 15 pgs. c.

PCT/US2011/042870 International Search Report and Written Opinion dated Dec. 6, 2011.

Morehead, H. (2007) "Siemens Global Gasification and IGCC Update," Siemens, Coal-Gen, Aug. 3, 2007, 17 pgs.

* cited by examiner

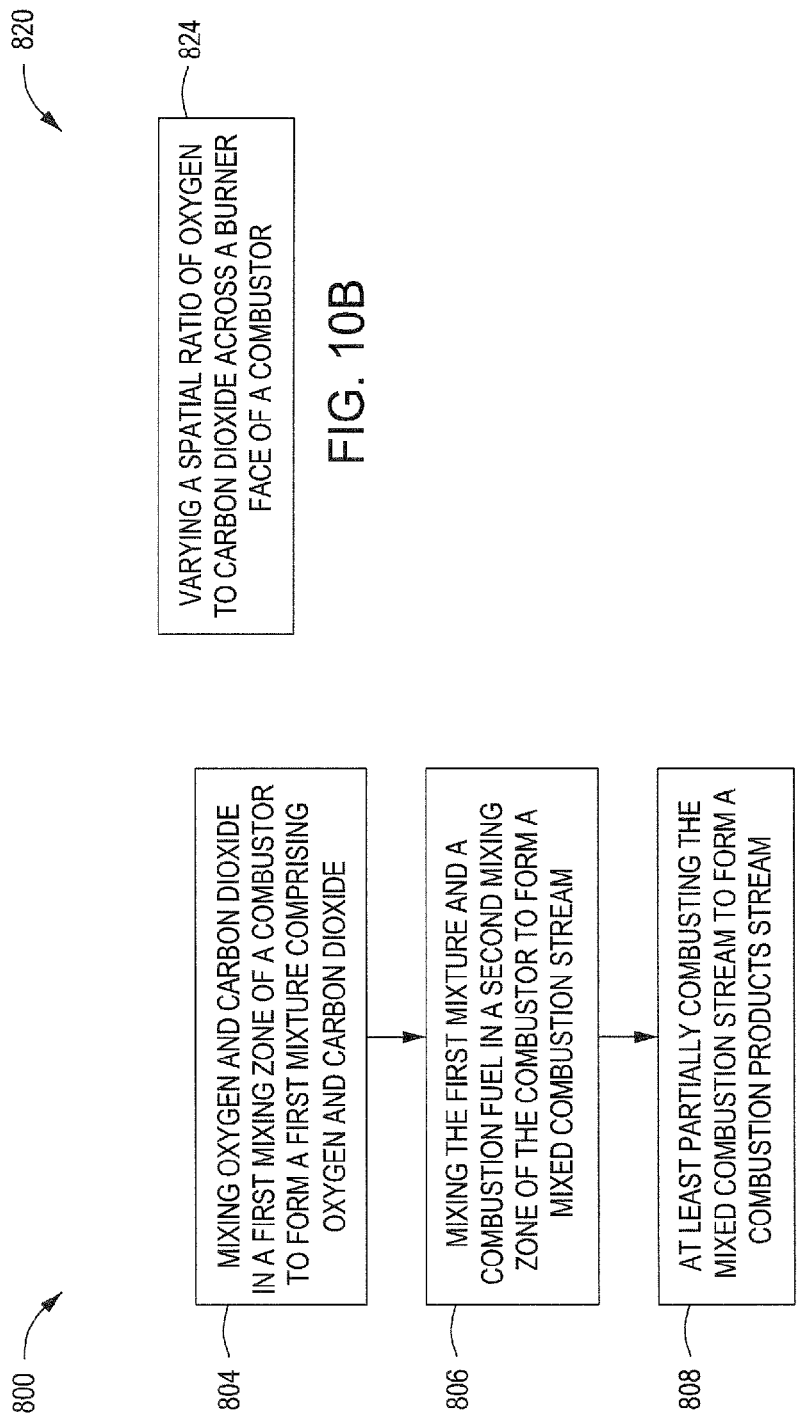

COMBUSTOR SYSTEMS AND COMBUSTION BURNERS FOR COMBUSTING A FUEL

CROSS REFERENCE TO RELATED APPLICATION

This application is a United States National Phase Application of International Patent Application No. PCT/US/2010/037325, filed on Jun. 3, 2010, which claims the benefit of U.S. Provisional Patent Application having Ser. No. 61/184,584, filed on Jun. 5, 2009, both of which are incorporated by reference herein.

FIELD

Embodiments of the present disclosure generally relate to systems and methods for combusting a fuel. More particularly, embodiments of the disclosure relate to systems and methods for an oxy-fuel type combustion reaction.

BACKGROUND

This section is intended to introduce various aspects of the art, which may be associated with exemplary embodiments of the presently disclosed inventions. This discussion is believed to assist in providing a framework to facilitate a better understanding of particular aspects of the presently disclosed inventions. Accordingly, it should be understood that this section should be read in this light, and not necessarily as admissions of prior art.

Some approaches to lower carbon dioxide ($CO_2$) emissions include fuel de-carbonization or post-combustion capture. These solutions, however, are expensive and reduce power generation efficiency, resulting in reduced power production, increased fuel demand, and increased cost of electricity to meet domestic power demand. Another approach is an oxy-fuel gas turbine in a combined cycle. However, there are no commercially available gas turbines that can operate in such a cycle.

The oxy-fuel concept is based on the combustion of hydrocarbons with pure oxygen ($O_2$) to produce carbon dioxide and water ($H_2O$). Such a combustion process, however, produces extremely high temperatures that reduce combustor life and generate soot and other unwanted combustion products. Hence, a cooling gas of some kind is desirable.

Various cycles have been proposed and studied that use carbon dioxide or steam as a mass flow gas through the turbine instead of air. Some basic laboratory experiments have been undertaken to better understand the physics of the combustion process in these oxy-fuel arrangements. While some experimental progress has been made in steam-based oxy-fuel arrangements, the design and implementation of an oxy-fuel gas turbine with a carbon dioxide working fluid for commercial applications has not been achieved. The design of a combustor for a carbon dioxide type gas turbine has never progressed beyond lab-scale experiments.

Challenges related to the design and implementation of carbon dioxide and oxygen mixing and combustion in a practical gas turbine combustor have not previously been addressed. Unlike steam, carbon dioxide has an inhibiting effect on the combustion process, which requires a unique design to handle the lower flame speeds resulting from the inhibiting effect. Carbon dioxide also radiates more energy than nitrogen or steam, which leads to the potential for pre-heating the reactants via radiative heat transfer. There is also an additional degree of freedom in an oxy-fuel combustor since the oxygen-to-fuel ratio can be controlled independently from the flame temperature, which is primarily dependent on the oxygen-to-carbon dioxide ratio.

Because of the additional degree of freedom in oxy-fuel combustion systems, the flow rate of oxygen can be controlled independently from the inert diluent (steam or carbon dioxide). This is not the case in a typical air gas turbine where there is a fixed ratio of approximately 3.76 inert nitrogen molecules for each oxygen molecule in the oxidizer stream. Another challenge of the oxy-fuel combustor is that oxygen is a precious commodity and must be obtained from any number of expensive, energy intensive processes, such as an air separation process, a special membrane separator, or some other process such as electrolysis of water. Typical air gas turbines have an air flow path that is designed to split the air stream such that a portion is used for the combustion reaction and a second portion is used for cooling of the combustion products and the combustion liner. This results in an exhaust stream that contains more than 10% oxygen.

Commonly assigned PCT Patent Publication No. WO2010/044958, which is incorporated herein by reference in its entirety for all purposes, discloses methods and systems for controlling the products of combustion using a system of flow controllers and sensors to maintain stoichiometric combustion. However, that disclosure does not provide details of the configurations in the combustor.

There is a need, therefore, for improved systems and methods for obtaining substantially stoichiometric combustion in an oxy-fuel type combustion reaction.

SUMMARY

Systems and methods for an oxy-fuel type combustion reaction are provided. In at least one specific embodiment, the combustor system can include a combustor having a first end, a second end, an outer shell, an inner shell, and an annular volume formed between the outer shell and the inner shell extending from the first end to the second end; a carbon dioxide inlet configured to introduce carbon dioxide to the combustor; an oxygen inlet configured to introduce oxygen to the combustor; a first mixing zone configured to mix a first portion of any carbon dioxide introduced through the carbon dioxide inlet with at least a portion of any oxygen introduced through the oxygen inlet to produce a first mixture comprising oxygen and carbon dioxide; a fuel inlet configured to introduce a fuel to the combustor; a second mixing zone configured to mix the first mixture and the fuel to produce a second mixture comprising oxygen, carbon dioxide, and fuel; and a combustion zone configured to combust the second mixture to produce a combustion product. A second portion of any carbon dioxide introduced through the carbon dioxide inlet can flow through one or more apertures disposed through the inner shell and mix with and cool the combustion product.

In at least one other specific embodiment, the combustor system can include a combustor having a first end, a second end, an outer shell, an inner shell, a combustion burner comprising a burner face, and a combustion zone; a carbon dioxide inlet, an oxygen inlet, and a fuel inlet; and a mixing zone configured to mix a first portion of any carbon dioxide introduced through the carbon dioxide inlet and at least a portion of any oxygen introduced through the oxygen inlet to produce a first mixture comprising oxygen and carbon dioxide. The first mixture can include a spatially varied ratio of oxygen-to-carbon dioxide across the burner face configured to generate a hot zone in a combustion zone to increase flame stability in the combustion zone.

In at least one specific embodiment, the method for combusting a fuel in a combustion system can include mixing oxygen and carbon dioxide in a first mixing zone of a combustor to produce a first mixture. The first mixture and a fuel can be mixed in a second mixing zone of the combustor to produce a second mixture. At least a portion of the fuel in the second mixture can be combusted to produce a combustion product.

In at least one other specific embodiment the method for combusting a fuel in a combustion system can include varying a spatial ratio of oxygen-to-carbon dioxide across a burner face of a combustor to increase flame stability in the combustor.

BRIEF DESCRIPTION OF THE DRAWINGS

The foregoing and other advantages of the present invention may become apparent upon reviewing the following detailed description and drawings of non-limiting examples of embodiments in which:

FIGS. 10A and 10B depict illustrative flow charts of methods for operating one or more of the combustors depicted in FIGS. 4A-9, according to one or more embodiments described.

DETAILED DESCRIPTION

Figure 1:
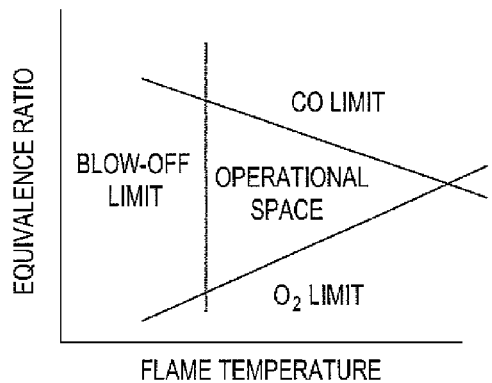
FIG. 1 depicts a graphical depiction showing an operational space for an equivalence ratio ($\phi$) versus a flame temperature.

In the following detailed description section, some specific embodiments of the present invention are described in connection with preferred, alternative, and exemplary embodiments. However, to the extent that the following description is specific to a particular embodiment or a particular use of the present invention, this is intended to be for illustrative purposes only and simply provides a description of the particular embodiments. Accordingly, the invention is not limited to the particular embodiments described below, but rather, it includes all alternatives, modifications, and equivalents falling within the true spirit and scope of the appended claims.

DEFINITIONS

Various terms as used herein are defined below. To the extent a term used in a claim is not defined below, it should be given the broadest definition persons in the pertinent art have given that term as reflected in at least one printed publication or issued patent.

As used herein, the "a" or "an" entity refers to one or more of that entity. As such, the terms "a" (or "an"), "one or more", and "at least one" can be used interchangeably herein unless a limit is specifically stated.

As used herein, the term "burner" refers to a piece of hardware that is comprised of at least a flame holding device and a fuel injector.

As used herein, the term "combustion zone" refers to the volume or spatial region where a flame is located and a majority, i.e. greater than 50%, of the heat release from combustion takes place. The upstream portion of the combustion zone, where the unburned reactants enter the flame, can and often does overlap with a mixing zone where the combustion fuel and oxygen can be mixed.

As used herein, the term "combustor" refers to the portion of a combustor system including the burner, combustion zone, an outer shell, an inner shell or "combustion liner," mixing zone(s), and related equipment and is typically shown with an open end. As such, the combustor can be combined with a transition piece and other features when integrated into a system, for example, a gas turbine system.

As used herein, the terms "inner shell" and "combustion liner" are used interchangeably and refer to a cylinder (typically having a circular cross-sectional shape and typically made of metal, but not necessarily) that forms an annulus with an outer shell of the combustor and separates bulk carbon dioxide flow from the mixing and combustion zones. The combustion liner can have one or more holes disposed therethrough where carbon dioxide can flow from the annulus into the combustion zone to remove heat from the liner surface and cool the combustion product.

As used herein, the terms "secondary inner shell" and "secondary combustion liner" are used interchangeably and refer to a cylinder (typically having a circular cross-sectional shape and typically made of metal, but not necessarily) that is disposed between an outer shell of the combustor and an inner shell of the combustor for a portion of a length of the combustor. For example, the secondary inner shell can be disposed between the outer shell and the inner shell and can extend from a location intermediate a first and second end of the combustor toward the second end of the combustor. The secondary inner shell can be connected to and/or about the inner shell at the location intermediate the first and second end of the combustor.

As used herein, the terms "comprising," "comprises," and "comprise" are open-ended transition terms used to transition from a subject recited before the term to one or elements recited after the term, where the element or elements listed after the transition term are not necessarily the only elements that make up the subject.

As used herein, the terms "containing," "contains," and "contain" have the same open-ended meaning as "comprising," "comprises," and "comprise." As used herein, the terms "having," "has," and "have" have the same open-ended meaning as "comprising," "comprises," and "comprise." As used herein, the terms "including," "includes," and "include" have the same open-ended meaning as "comprising," "comprises," and "comprise."

As used herein, the term "mixing zone" refers to a volume or spatial region of a combustor where at least two separate gaseous streams can be mixed. In particular, the mixing zone can include an initial mixing of the at least two streams (e.g., where a second stream is initially introduced into a first stream) and any extended volume where the two streams continue to mix together. Often an increased mixing distance can result in more complete mixing of the first and second streams. In particular disclosed embodiments, there can be a "first mixing zone" including a spatial region where oxygen is mixed with carbon dioxide to produce an oxygen/carbon dioxide mixture sometimes referred to as an "oxygenation stream" or a "synair stream." There can also be a "second mixing zone," which refers to another spatial region where the oxygen/carbon dioxide mixture begins mixing with a combustion fuel stream located between a combustion fuel injector and a flame. In some cases for combustor arrangements having a first and second mixing zone, the first mixing zone will terminate at or in the second mixing zone.

As used herein, the term "mixing device" refers to hardware placed in a flow path of a gaseous stream having two unique components to facilitate the mixing of the components of the gaseous stream by generating a turbulent wake or recirculation zone in the gaseous stream. Some examples of mixing devices can include, but are not limited to, bluff bodies, mesh wires, wedges, or any combination thereof.

As used herein, the term "equivalence ratio," refers to a ratio of oxygen to fuel divided by a stoichiometric ratio of oxygen to fuel in a gaseous stream including both oxygen and fuel.

As used herein, the term "flame stability," refers to a flame in a combustion zone having a margin between a stable operating point and an operating point at which the flame is extinguished. In one example, enhancing flame stability can include any means for increasing this margin. Some exemplary means of accomplishing enhanced flame stability can include, but are not limited to, increasing the flame temperature, decreasing the gas velocity upstream of the flame, or both.

As used herein, the term "anchor flame," refers to a pre-mixed or non pre-mixed (e.g., diffusion) flame in a combustion zone that can be utilized for the purpose of enhancing the flame stability. In some operating scenarios, the anchor flame can have a rich equivalence ratio (e.g., a range of from about 2 to about 3). The anchor flame can have a similar effect in an oxygenation (synair) breathing combustor to a diffusion pilot flame in a lean pre-mixed combustor in an air-breathing gas turbine.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($CH_4$) as a major component, i.e. greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof. The natural gas can also contain minor amounts of contaminants such as water, nitrogen, iron sulfide, wax, crude oil, or any combination thereof.

As used herein, the term "natural gas feed stream" refers to a stream of natural gas after it has undergone at least some pretreatment, as described elsewhere in the disclosure.

As used herein, the term "stoichiometric combustion" refers to a combustion reaction having a volume of reactants comprising a fuel and an oxidizer and a volume of products formed by combusting the reactants where the entire volume of the reactants is used to form the products. In the base oxy-fuel case, a stoichiometric reaction (e.g., combustion) in which methane is the only source of fuel has the following balance: $2O_2+CH_4=2H_2O+CO_2$. As used herein, the term "substantially stoichiometric combustion" refers to a combustion reaction having a molar ratio of combustion fuel to oxygen ranging from about 0.9:1 to about 1.1:1, or more preferably from about 0.95:1 to about 1.05:1.

As used herein, the term "stream" refers to a volume of fluids, although use of the term stream typically means a moving volume of fluids (e.g., having a velocity or mass flow rate). The term "stream," however, does not require a velocity, mass flow rate, or a particular type of conduit for enclosing the stream.

Detailed Description

Combustion processes and combustor systems designed for oxy-fuel combustion are provided. The oxy-fuel combustion can occur in a gas turbine with a working fluid comprised primarily of carbon dioxide. In one or more embodiments, one or more problems associated with high temperature oxy-fuel combustion can be at least partially corrected. For example, the development of Polycyclic Aromatic Hydrocarbons (PAH's), which lead to soot production and/or the production of problematic combustion products such as carbon monoxide (CO) can be at least partially reduced. One embodiment of the combustion system can include a combustor having a first mixing zone for at least partially mixing, contacting, or otherwise combining oxygen and carbon dioxide to form an "oxygenation" or "synair" stream, a second zone for at least partially mixing, contacting, or otherwise combining the oxygenation stream and a combustion fuel stream to form a combustion stream. The combustion stream can be at least partially burned or combusted in a combustion zone to produce a combustion products stream. The second mixing zone can at least partially overlap with the combustion zone and/or the first mixing zone.

The combustor can be used in a gas turbine having an inlet compressor for compressing, for example a carbon dioxide stream and an expander for generating power. The gas turbine can be an integrated turbine operating on a single shaft, a multiple-shaft turbine, or a non-integrated turbine with an external burner, and can use an independent compressor and a hot gas expander of a power turbine, depending on the temperatures, volumes, and other variables of the particular system. In alternative embodiments, the combustor can be a stand-alone unit such as a furnace.

In one or more embodiments, the combustion system can be fed or supplied with a carbon dioxide stream and an oxygen supply stream, which have been at least partially mixed or otherwise combined to produce an oxygenation or synair stream comprising oxygen and carbon dioxide in the combustor. The combustion system can further include a combustion fuel stream and a combustion zone, where the combustion zone can be configured to at least partially mix, contact, or otherwise combine and at least partially combust the combustion fuel stream and the oxygenation stream in a substantially stoichiometric combustion reaction to produce a combustion product stream substantially comprising water (steam) and carbon dioxide. In one or more embodiments, a high pressure combustion (e.g., greater than about 10 atmospheres) process can be used. The temperature of the combustion products stream can be controlled by adjusting the amount of carbon dioxide mixed with the oxygen when forming the oxygenation stream. As such, in some embodiments, the system can include a temperature sensor for measuring the temperature of the combustion products stream. The amount of carbon dioxide mixed with oxygen to produce the oxygenation stream can be increased to decrease the temperature of the combustion products stream. Similarly, the amount of carbon dioxide mixed with oxygen to produce the oxygenation stream can be decreased to increase the temperature of the combustion products stream.

High flame temperatures can be advantageous in that high flame temperatures can improve flame stability. High flame temperatures, however, can also be problematic for the materials used to fabricate the combustion liner and the turbine inlet nozzle. Therefore, the combustion products stream can be cooled by carbon dioxide prior to entering the turbine inlet nozzle. High flame temperatures can also cause dissociation of the desired combustion products such as carbon dioxide and can result in a higher percentage of contaminants, such as carbon monoxide, in the products. FIG. 1 depicts a graphical depiction showing an operational space for an equivalence ratio ($\phi$) versus a flame temperature. FIG. 1 illustrates one challenge of a carbon dioxide/oxy-fuel combustion process where there is a very small operational space that produces the desired flame stability and composition of the combustion products. If the flame temperature is too low, the flame blows out and power generation is stopped. Higher flame temperatures, however, can also lead to increased concentrations of carbon monoxide and/or oxygen in the combustion products stream. If these compositions are too high an additional reaction, possibly involving a catalyst, can be used to alter or otherwise modify the composition of the combustion products stream. An additional challenge of oxy-fuel combustion with a carbon dioxide working fluid or diluent is that the flames are less stable than flames in air at similar conditions. Carbon dioxide has both thermal effects and reaction-inhibiting (kinetic) effects on the chemistry in a flame produced by combusting a hydrocarbon(s) in contrast to nitrogen, which only has a thermal effect.

Figure 2:
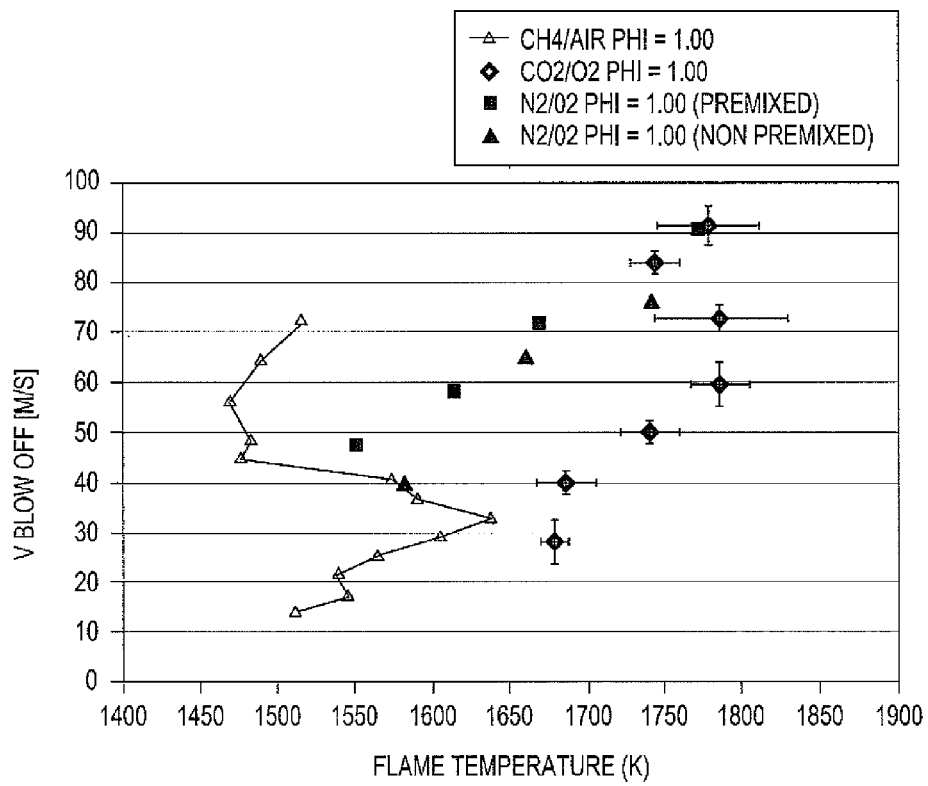
FIG. 2 depicts graphical depiction showing experimental flame blow off conditions for the combustion of methane ($CH_4$) in carbon dioxide/oxygen ($CO_2/O_2$), the combustion of methane in nitrogen/oxygen ($N_2/O_2$), and a baseline system for the combustion of methane in air at an equivalence ratio ($\phi$) of 1.

FIG. 2 depicts a graphical depiction showing experimental flame blow off conditions for the combustion of methane ($CH_4$) in carbon dioxide/oxygen ($CO_2/O_2$), the combustion of methane in nitrogen/oxygen ($N_2/O_2$), and a baseline system for the combustion of methane in air at an equivalence ratio ($\phi$) of 1. The combustion conditions are atmospheric pressure and a temperature of 260° C. (500° F.). Flame temperature is shown on the abscissa, gas velocity is shown on the ordinate, and the data points indicate the point where the margin to blow off is zero and the flame extinguishes. The line denotes where a methane/air flame blows off and the diamonds denote the blow off of a methane flame in a mixture of carbon dioxide and oxygen. The oxy-fuel flame consistently blows off 300° C. higher than the air flame for the same gas velocity. In certain embodiments of the disclosed combustion systems, gas mixtures can be generated that allow for adequate flame stability and limit the concentration of unwanted contaminants in the combustion products.

Another feature of combustion using carbon dioxide as a working fluid or diluent is that carbon dioxide is a strong absorber/emitter of infrared radiation. A combustor having first and second mixing zones in a line of sight with the combustion zone can benefit from the fact that the reactants can be preheated as a result of the infrared radiation from the flame. This has a more measurable impact than in combustors where air is used as the oxidizer.

Another aspect of the combustion system is that the oxygen stream can be less expensive to obtain at high pressures due to its lower molecular weight and the potential for pumping it as a liquid. As a result, combustor systems and methods utilizing an oxygen stream can be designed to minimize the pressure drop of the carbon dioxide at the sacrifice of the oxygen stream pressure drop. For example, relatively high-pressure jets of oxygen can be used to provide swirl to the carbon dioxide stream in order to reduce the pressure drop that would be present if the carbon dioxide stream was swirled using a hardware swirler with a plurality of vanes. In another example, a gas ejector can be used to mix the oxygen and carbon dioxide streams to produce the oxygenation or synair stream upstream of the flame. The high pressure oxygen stream can be used as the motive gas in a typical ejector where the motive gas is accelerated through an orifice to create a high velocity stream with a low static pressure. The static pressure of the accelerated oxygen is lower than the pressure of the carbon dioxide stream connected to the suction side of the ejector. This pressure differential can drive the carbon dioxide stream into the oxygen stream to produce the oxygenation or synair stream. It can also provide a relatively simple way for mixing only a portion of the carbon dioxide stream (orifice sized accordingly) with the oxygen stream. One benefit of an ejector can be that the ejector can transfer the pressure loss due to mixing from the carbon dioxide stream to the oxygen stream where excess pressure can be available.

In one or more embodiments, carbon dioxide and oxygen can be mixed to produce the oxygenation or synair stream within the combustor. The amount of carbon dioxide mixed with oxygen can provide a way to control the temperature of the products of combustion. The amount of carbon dioxide mixed with oxygen can also affect the flame stability margin and the composition or makeup of the combustion products. The combustor can house or include a combustion liner. The combustion liner can contain the combustion zone and serves to direct the primary flow of carbon dioxide from a compressor to the first end of the combustor. The combustion liner design can include quench ports to provide additional carbon dioxide to a burnout zone within the combustor to control a turbine inlet temperature and/or prevent the high temperature of combustion from impinging directly on the combustion liner.

In one or more embodiments, the combustor system can include a control system that measures the amount of hydrocarbons introduced to the combustor. The control system can calculate, determine, or otherwise estimate and control, alter, or otherwise adjust the amount of oxygen introduced to the combustor to provide a desired ratio of oxygen to hydrocarbons or combustion fuel. The control system can also use feedback from instrumentation configured to monitor or analyze the combustion products and can update the oxygen supply stream flow controller to ensure the desired combustion is achieved and/or to ensure the correct amount of oxygen is introduced to the oxygenation stream. An optional post combustion step, which can include a catalyst, can be used depending on the hydrocarbon mixture that is introduced to the combustor. This post combustion step can reduce the concentration of contaminants, e.g., oxygen and/or carbon monoxide, in the combustion products to the levels required to avoid serious corrosion problems in enhanced oil recovery (EOR) facilities, for example.

In one or more embodiments, the composition of the reactants can be varied, especially the oxygen-to-carbon dioxide ratio across a burner face of the combustor. For example, a synair mixing device that restricts, impedes, or otherwise reduces the flow of carbon dioxide into the first mixing zone can create or produce a variation in the oxygen-to-carbon dioxide ratio across the combustor cross section. In another example, the oxygen stream can be split or divided into at least two streams, at least one of which can be used to increase the oxygen concentration in part of the combustor to create a hotter flame locally. A hotter flame temperature can improve flame stability.

In one or more embodiments, an oxy-fuel/co-generation type of combustion system, such as the ultra-low emission power generation systems and processes discussed and described in U.S. Provisional Patent Application No. 61/072, 292 can be used. Injecting the oxygen and fuel directly into the carbon dioxide stream inside the combustor can reduce the risks and limitations associated with combustion of the fuel with pure oxygen. The combustion system can also reduce system complexity as compared to a combustion system that mixes the oxygen and carbon dioxide outside of the combustor and reduces the amount of oxygen that would be wasted if the oxygen and carbon dioxide mixture was generated from the full carbon dioxide stream.

Figure 3A:
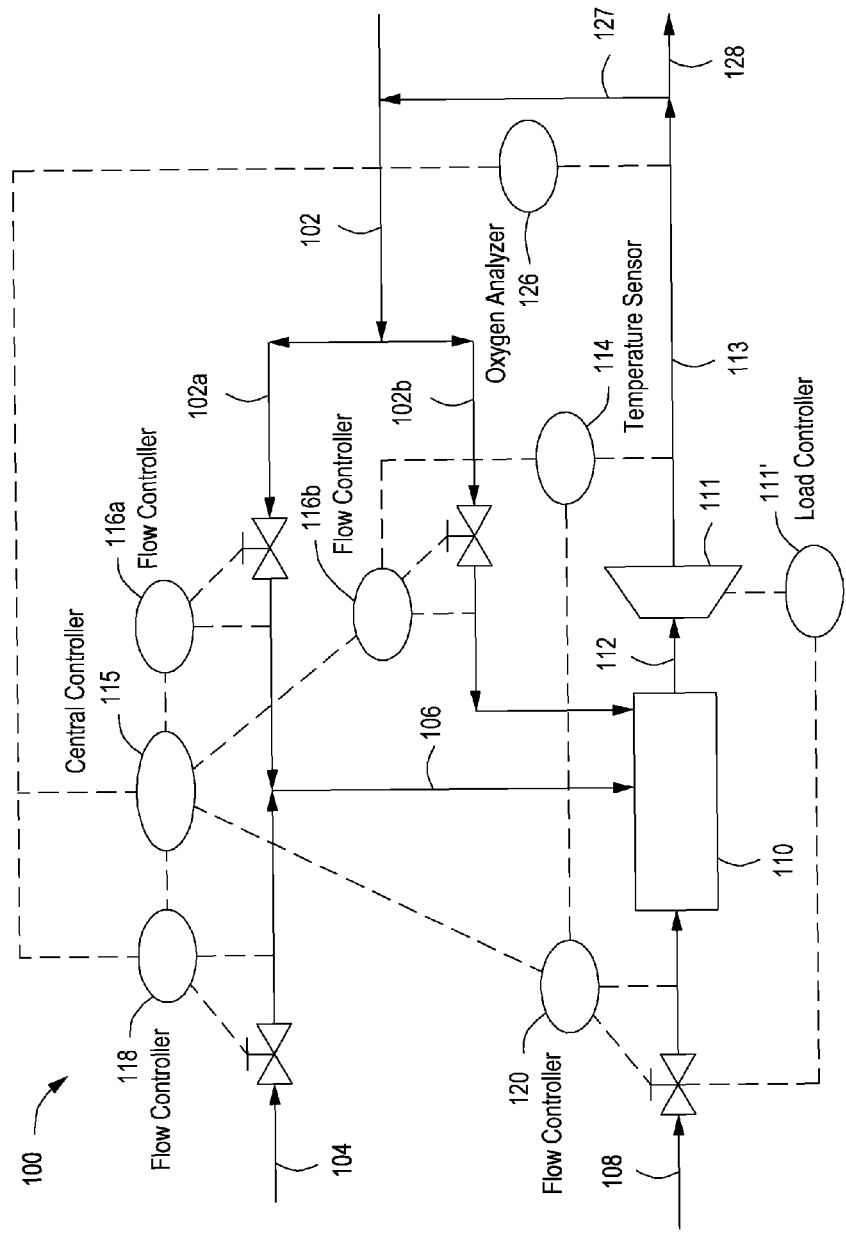
FIGS. 3A-3F depict schematics of illustrative combustion systems, according to one or more embodiments described.

Referring now to the figures, FIGS. 3A-3F depict schematics of illustrative combustion systems 100, 140, 150, 160, 170, and 180, respectively, according to one or more embodiments. In particular, FIG. 3A depicts a schematic of an illustrative combustion system 100 that can include one or more combustors (e.g., a "combustor can") 110, expanders 111, and sensors (two are shown 114, 126). The combustion system 100 can also include a carbon dioxide ($CO_2$) stream via line 102 that can be split or divided into at least a first portion via line 102a and a second portion via line 102b and an oxygen supply stream via line 104 that can be combined with the first portion 102a of the carbon dioxide stream to produce an oxygen/carbon dioxide mixture or "oxygenation stream" or "synair stream" via line 106. The combustion system 100 can also include a combustion fuel stream via line 108. The combustion fuel stream in line 108 can include methane ($CH_4$) or a mixture of methane, one or more $C_2$-$C_{20}$ hydrocarbons, hydrogen ($H_2$), inert gasses such as nitrogen, carbon dioxide, and/or argon, or any combination thereof.

The oxygen supply stream in line 104 can have an oxygen concentration ranging from a low of about 90 mol %, about 93 mol %, about 95 mol %, about 97 mol %, about 98 mol %, about 99 mol %, about 99.5 mol %, or about 99.9 mol %. The oxygen supply stream in line 104 can include one or more additional components such as nitrogen, argon, helium, or combinations thereof. In at least one specific embodiment, the oxygen supply stream in line 104 can include from about 90 mol % to about 99 mol % oxygen and from about 1 mol % to about 10 mol % argon. The carbon dioxide stream in line 102 can have a carbon dioxide concentration ranging from a low of about 70 mol %, about 80 mol %, about 90 mol %, about 95 mol %, about 97 mol %, about 99 mol %, about 99.5 mol %, or about 99.9 mol %. In another example, the carbon dioxide stream in line 102 can have a carbon dioxide concentration ranging from a low of about 70 mol %, about 80 mol %, about 90 mol %, about 95 mol %, about 97 mol %, about 99 mol %, about 99.5 mol %, or about 99.9 mol % on a dry basis. The carbon dioxide stream in line 102 can include one or more additional components such as nitrogen, argon, helium, water (liquid and/or gas), hydrocarbons, carbon monoxide, or combinations thereof. In at least one specific embodiment, the carbon dioxide stream in line 102 can have a carbon dioxide concentration ranging from about 85 mol % to about 95 mol %, from about 0.5 mol % to about 5 mol % hydrocarbons, from about 0.5 mol % to about 5 mol % carbon monoxide, from about 0.5 mol % to about 10 mol % water (liquid and/or gas), or any combination thereof.

The combustor 110 can be configured to receive at least a portion of the oxygenation stream via line 106 and at least a portion of the combustion fuel stream via line 108. The oxygenation stream via line 106 and the combustion fuel stream via line 108 can be mixed, combined, or otherwise contacted with one another within the combustor 110 to produce a reactant mixture or combustion stream. The reactant mixture can be at least partially combusted within the combustor 110 to produce a combustion products stream via line 112. At least a portion of the combustion products stream via line 112 can be introduced to the expander 111 to produce an expanded combustion products stream via line 113. The expander 111 can be operatively connected to or otherwise in communication with a load controller 111'. The expanded combustion products stream in line 113 can be split to form a first combustion products stream via line 127 and a second combustion products stream via line 128. The first combustion products stream via line 127 can provide at least a portion of the carbon dioxide stream in line 102. The second combustion products stream via line 128 can be used in an enhanced oil recovery (EOR) process or operation, sequestration, vented to the atmosphere, or any other purpose.

The first sensor ("temperature sensor") 114 can determine, detect, or otherwise estimate a temperature of the combustion products stream in line 112 and/or the expanded combustion products stream in line 113. The second sensor ("oxygen analyzer") 126 can determine, detect, or otherwise estimate a concentration of oxygen in the combustion products stream in line 112 and/or the expanded combustion products stream in line 113. The oxygen analyzer 126 can also be configured to determine, detect, or otherwise estimate a concentration of other components in the expanded combustion products stream in line 113. Additional or other components that can be detected via the oxygen analyzer 126 can include, but are not limited to, carbon monoxide, nitrogen oxides, combustion fuel, or any combination thereof. Temperature data from the temperature sensor 114 can be used to control the flow rate of the carbon dioxide stream 102, the oxygen stream 104, and/or the combustion fuel stream 108, which can regulate the temperature of the combustion products stream 112 and/or the composition of the combustion products stream 112. Oxygen data from the oxygen analyzer 126 can be used to control the flow rate of the oxygen supply stream via line 104, the carbon dioxide stream via line 102, and/or the combustion fuel stream via line 108 until a substantially stoichiometric combustion is achieved.

Still referring to FIG. 3A, the system 100 can also include a central controller 115. The central controller 115 can be operatively connected to or otherwise in communication with, e.g., a wireless link, a first flow controller 116a, a second flow controller 118, a third flow controller 120, and/or a fourth flow controller 116b. The first flow controller 116a can control or otherwise regulate an amount of the first portion of the carbon dioxide stream in line 102a. The second flow controller 118 can control or otherwise regulate an amount of the oxygen supply stream in line 104. The third flow controller 120 can control or otherwise regulate an amount of the combustion fuel stream in line 108. The fourth flow controller 116b can control or otherwise regulate an amount of the second portion of the carbon dioxide stream in line 102b.

The central controller 115 can also be connected to or otherwise in communication with the temperature sensor 114 and/or the oxygen sensor 126 to determine or otherwise estimate the temperature of the combustion products stream in line 113 and/or an amount of oxygen in the expanded combustion products stream in line 113. The determined or estimated temperature and/or oxygen concentration of the expanded combustion products steam in line 113 can be used, at least in part, to control, regulate, or otherwise adjust the flow rate of the oxygen supply stream in line 104, the flow rate of the first portion of the carbon dioxide stream in line 102a, the flow rate of the combustion fuel stream in line 108, and/or the flow rate of the second portion of the carbon dioxide stream in line 102b. For example, the central controller 115 can control the flow rate of the combustion fuel stream in line 108 and/or the oxygen supply stream in line 104 to maintain a desired molar ratio therebetween as load conditions in the combustion system 100 change.

The carbon dioxide stream in line 102 can be provided from any convenient source. For example, at least a portion of the carbon dioxide stream in line 102 can be derived from diverting or splitting at least a portion of the expanded combustion products stream 113 via stream 127. In another example, the combustion system 100 can be located near another source of carbon dioxide, such as an external pipeline network, a high carbon dioxide gas well, a gas treatment plant, or the like. In one or more embodiments, the combustion products via line 127 can be at least partially treated. For example, the combustion products in line 127 can be at least partially treated in a filtering system, e.g., a membrane, mole sieve, absorption, adsorption, or other system, which can at least partially remove potentially dangerous or undesirable components, such as un-reacted oxygen, carbon monoxide, and/or hydrocarbons. In particular, if the oxygen analyzer 126 determines or estimates that the combustion products stream 112 and/or the expanded combustion products stream 113 has an undesirably high level of oxygen, then using the combustion products stream in line 112 and/or 113 as a working fluid or diluent can be avoided. In other words, should the oxygen analyzer 126 detect an undesirable amount of oxygen or other contaminant in the combustion products steam in line 112 and/or 113, the stream in line 102 can be acquired from another source.

Similarly, high levels of hydrocarbons (i.e. combustion fuel) could also be unacceptable, depending on the combustor 110 and could need to be at least partially removed and/or separated before use as a diluent stream in 102b. In one or more embodiments, it can be preferred and intended that the combustion products via line 112 be produced from a substantially stoichiometric combustion. As such, the combustion products via line 112 should have less than about 3.0 volume percent (vol %) oxygen, or less than about 1.0 vol % oxygen, or less than about 0.1 vol % oxygen, or even less than about 0.001 vol % oxygen and less than about 3.0 vol % hydrocarbons, or less than about 1.0 vol % hydrocarbons, or less than about 0.1 vol % hydrocarbons, or even less than about 0.001 vol % hydrocarbons.

The second combustion products stream via line 128 can be used for sales, used in another process requiring carbon dioxide, and/or compressed and injected into a terrestrial reservoir for enhanced oil recovery (EOR), sequestration, or another purpose. Similar to the first combustion products stream in line 127, the second combustion products stream in line 128 may need to undergo some conditioning or treatment before use to remove potential contaminants or reactants such as nitrogen oxides (NOx), oxygen, carbon monoxide, and/or the like. Again, it can be preferred that the oxygen supply stream in line 104 include substantially no nitrogen, and that the combustion products stream in line 112 be produced via a substantially stoichiometric combustion. As such, the second combustion products stream in line 128 can have less than about 3.0 vol % oxygen, or less than about 1.0 vol % oxygen, or less than about 0.1 vol % oxygen, or even less than about 0.001 vol % oxygen and less than about 3.0 vol % NOx, or less than about 1.0 vol % NOx, or less than about 0.1 vol % NOx, or even less than about 0.001 vol % NOx.

The oxygen supply stream via line 104 can be provided by an air separation unit (ASU) or other process or system providing high purity oxygen. The separated nitrogen can be used in another related process, such as in a nitrogen injection well as discussed and described in U.S. Provisional Patent Application No. 61/072,292. In one or more embodiments, the oxygen supply stream in line 104 can include from about 90 vol % to about 99.9 vol % oxygen. In another example, the oxygen supply stream in line 104 can include from about 90 vol % to about 99.9 vol % oxygen with at least a portion of the balance including argon, nitrogen, carbon dioxide, or any combination thereof. In another example, the oxygen supply stream in line 104 can include from about 95 vol % to about 96 vol % oxygen with about 4 vol % to about 5 vol % argon and less than about 0.2 vol % carbon dioxide.

The central controller 115 can be or include any type of control system configured to receive data inputs, such as flow rates and compositions, and send signals to control flow rates via, for example, valves, pumps, compressors, and/or any other device that can be used to control or otherwise adjust a flow rate. In one embodiment, the central controller 115 can include a programmable computer having user input devices such as a keyboard and/or mouse, output devices such as a monitor and/or speakers, and can operate using active memory (RAM), and be operably connected to hard disk drives, optical drives, network drives, and databases via a LAN, WAN, Wi-Fi, or other external network.

Any one or more of the flow controllers 116a, 116b, 118, and 120 can include programmable automated controllers configured to receive and process signals from the central controller 115. Any one or more of the flow controllers 116a, 116b, 118, and 120 can be operably connected to or otherwise in communication with one or more flow valves or vanes, vents, or other means of increasing and/or decreasing the flow rate of a substantially gaseous stream. Additionally, in at least one embodiment, any one or more of the flow controllers 116a, 116b, 118, and 120 can be operably connected to or otherwise in communication with one or more flow and/or composition sensors, which may provide additional data input, such as to verify changes in the flow rates of the respective streams controlled via the flow controllers 116a, 116b, 118, and/or 120. In order to maintain flame stability and effective control, it can be beneficial to utilize a high speed controller for any or all of the controllers 116a, 116b, 118, and 120.

Although flow controller 116b can be an active sensor as discussed and described above, the flow rate of the second portion of the carbon dioxide stream (e.g., diluent stream) via line 102b can be primarily passively controlled in one exemplary embodiment. For example, the combustor 110 can include a combustion liner having one or more quench ports (e.g., dilution holes) with a particular pattern and hole sizes configured to provide dilution and control temperatures within the combustor 110. Hence, the flow rate of the carbon dioxide or diluent stream via line 102b can be primarily dependent upon the hardware design of the quench ports in the combustor 110. Additionally, the flow controller 116b can be useful for shutting off the flow of the second portion of the carbon dioxide stream in line 102b in case of shut down, contamination of the stream 102b, or some other reason. The central controller 115 can be configured to include at least one safety interlock and/or shutdown logic and/or an alarm if the system 100 gets out of control to protect the downstream machinery.

The temperature sensor 114 can be or include a single sensor or can additionally include a backup sensor for redundancy or can include an array of sensors in and around the combustion products stream in line 112 and/or the expanded combustion products stream in line 113. Any type of appropriate temperature sensor can be used, although the temperature sensor chosen should have a high resistance to heat and be able to effectively operate at temperatures at or above about 1,093° C. (2,000° F.), above about 1,205° C. (2,200° F.), or even at or above about 1,900° C. (3,450° F.). In one example, the temperature sensor(s) 114 can send data directly to the flow controllers 116a, 116b, 118, and/or 120, or can send data to the central controller 115, which can then control the response of the flow controllers 116a, 116b, 118, and/or 120. In another example, the temperature sensor(s) 114 can send data directly to the combustion fuel stream flow controller 120. Additionally and/or alternatively, the temperature sensor(s) 114 can take data from inside the combustor 110 near the exhaust or downstream of the combustor 110 after exiting, at multiple locations along the combustion products stream 112, or some combination thereof. The temperature should be limited to within certain operating parameters, which will depend highly on the equipment in use, the type of combustion fuel stream and other input streams available, the potential uses for the combustion products stream in line 112, and other factors.

Generally, the temperature should be below about 1,925° C. (3,500° F.) to avoid NOx production and because most commercial combustors 110 cannot operate above such temperatures, but this limitation can be set higher if the material of the combustor 110 can operate at higher temperatures and there is no nitrogen in the system 100. The temperature is preferably less than about 1,370° C. (2,500° F.) at the inlet of the expander 111. Such high temperatures can also contribute to the formation of undesirable Polycyclic Aromatic Hydrocarbons (PAH's), which can lead to soot production. However, the temperature must be sufficiently high to avoid flame burnout and sufficiently high to effectively combust substantially all of the oxygen ($O_2$) and hydrocarbons (e.g., stoichiometric combustion temperature) to produce a combustion products stream 112 requiring only limited conditioning before use in enhanced oil recovery (EOR) or as a diluent in the combustion system 100. For many cases, the preferred temperature can be from at least about 815° C. (1,500° F.) to about 1,370° C. (2,500° F.) or from at least about 870° C. (1,600° F.) to about 1,040° C. (1,900° F.).

The oxygen analyzer 126 can be or include a single sensor or can additionally include a backup sensor for redundancy, or an array of sensors at multiple locations within the combustion products stream in line 112 and/or the expanded combustion products stream in line 113. For example, a plurality of lambda and/or wideband zirconia oxygen sensors can be used to provide feedback to one of the central controller 115 and/or the oxygen supply stream flow controller 118. If the lambda sensor is used, the central controller 115 can be configured to dither the ratio of the fuel in the combustion fuel stream 108 to the oxygen in the oxygen supply stream 104 as the oxygen content of the combustion products stream 112 varies from a stoichiometric coefficient (equivalence ratio ($\phi$)) to below 1.0 and/or above 4.0. The dithering process can be similar to those used in the automotive industry for internal combustion engines. In any case, the oxygen content of the combustion products stream in line 112 is preferably low, from less than about 3.0 vol % to less than about 1.0 vol % to less than about 0.1 vol % to less than about 0.001 vol %. If the amount of oxygen is too high, then the flow rate of the oxygen supply stream via line 104 can be reduced and/or the flow rate of the combustion fuel via line 108 can be increased. Reducing the flow rate of the oxygen supply stream via line 104 can lower the flame temperature, as discussed above, requiring an adjustment of the flow rate of the combustion fuel stream via line 108.

Figure 3B:
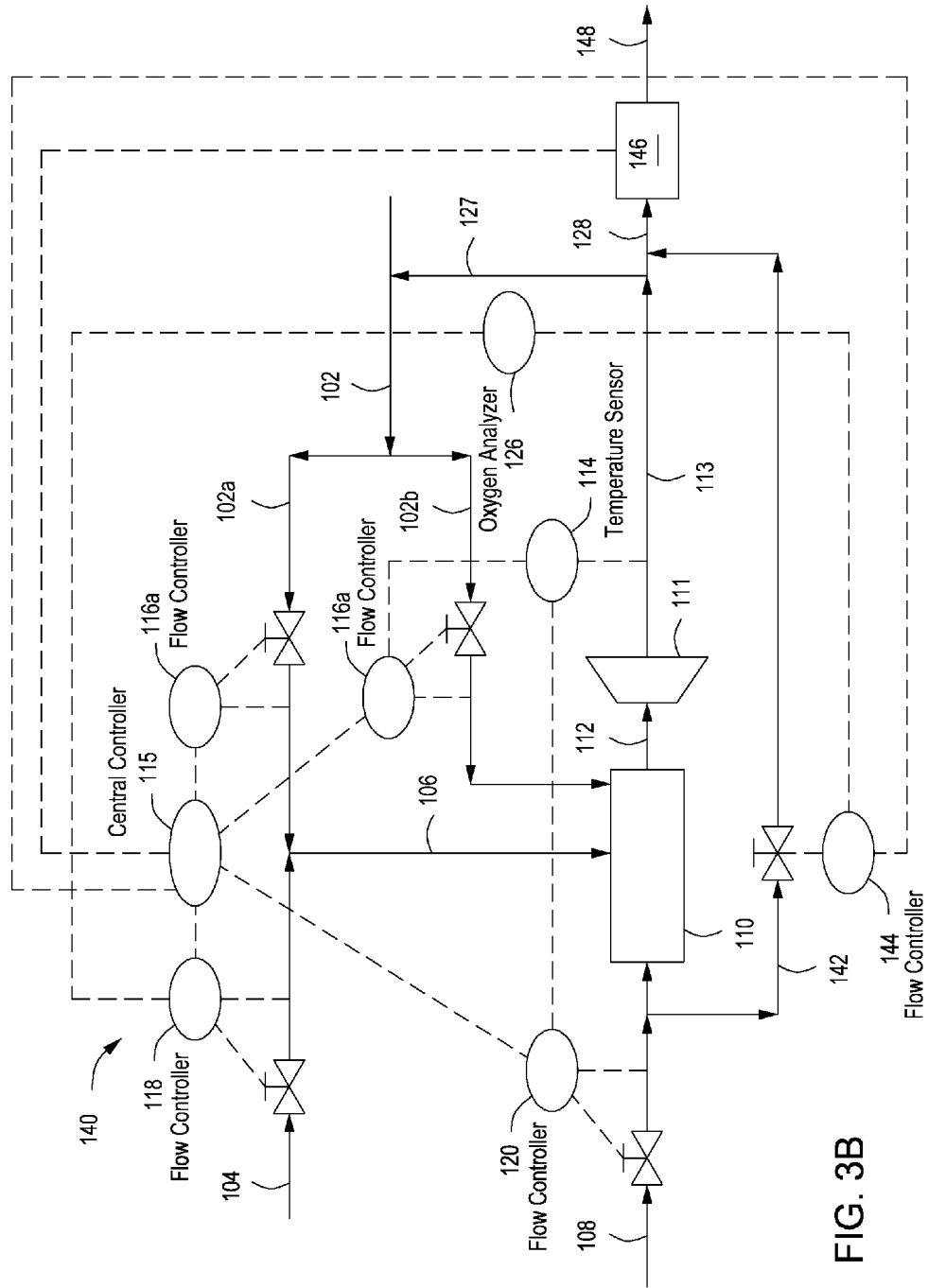

FIG. 3B depicts a schematic of an illustrative combustion system 140, which is similar to the combustion system 100 as shown in FIG. 3A, but further includes optional features configured to further treat or condition the combustion products stream in line 112 and/or the expanded combustion products stream in line 113. As such, the combustion system 140 shown in FIG. 3B may be best understood with reference to FIG. 3A. The combustion system 140 includes the features disclosed with respect to the combustion system 100 shown in FIG. 3A, and further includes a post-combustion catalysis apparatus 146. The post-combustion catalysis apparatus 146 can be configured to reduce the oxygen and/or carbon monoxide content in the combustion products stream in line 112, the expanded combustion products stream in line 113, the first combustion products stream in line 127, and/or the second combustion products stream in line 128. An at least partially treated or purified combustion product stream via line 148 can be recovered from the catalysis apparatus 146. The combustion system 140 can also include a combustion fuel bypass stream via line 142 that can include a flow controller 144 for controlling a flow rate of the combustion fuel bypass stream 142. The oxygen analyzer 126 can be operatively connected to the flow controller 144 directly or indirectly via the central controller 115. Additional flow controllers and oxygen analyzers (not shown) can be used in certain specific embodiments where the combustion fuel bypass stream 142 is split and/or the second combustion products stream via line 128 is looped, as discussed and described in more detail below.

The catalysis apparatus 146 can be a single device or a plurality of devices in parallel, series, or a combination of parallel and series. Preferably the catalysis apparatus 146 can be a small device requiring only a small amount of power to operate. In particular, the catalysis apparatus 146 can include a carbon monoxide reduction catalyst and/or an oxygen reduction catalyst that is normally used in a Heat Recovery Steam Generator (HRSG) to meet emissions requirements. Such a system is generally not designed to remove large amounts of oxygen, but if significant amounts of oxygen remain in the combustion products streams 112, 113, 127, and/or 128, the streams) 112, 113, 127, 128 can be recycled through the catalysis apparatus 146 more than once before further processing or use, e.g., compression and injection for enhanced oil recovery (EOR). As such, in some embodiments, another oxygen analyzer (not shown) can be included and used to measure or otherwise estimate an oxygen concentration in the at least partially treated or purified combustion products stream in line 148 to ensure that the concentration of oxygen is sufficiently low (e.g., less than about 0.5 vol % oxygen or less than about 0.1 vol %) to avoid corrosion of the compression and injection equipment and avoid souring the reservoir by injecting oxygen that can react with the hydrocarbons remaining in the reservoir.

The combustion fuel bypass stream (e.g., second portion of the combustion fuel stream) via line 142 can be mixed, contacted, or otherwise combined with the expanded combustion products stream in line 113 downstream from where the first combustion products stream via line 127 is divided from the expanded combustion products stream 113. The combustion fuel bypass stream via line 142 can be introduced to the second combustion products steam in line 128 upstream from the catalysis apparatus 146 so that the additional hydrocarbons can be used in the catalysis apparatus 146 to improve oxygen removal efficiency. In one or more embodiments, the combustion fuel bypass stream 142 can be split and introduced to the second combustion products stream in line 128 before the catalysis apparatus 146 and to the at least partially treated or purified combustion products stream in line 148. In the embodiment where the at least partially treated or purified combustion products stream via line 148 is looped back to the catalysis apparatus 146, it can be beneficial to introduce a portion of the combustion fuel bypass stream 142 into the at least partially treated or purified combustion products stream in line 148 before looping it back to the catalysis apparatus 146. Beneficially, the combustion fuel bypass stream 142 can be configured to reduce the volume percent of oxygen in the at least partially treated or purified combustion products stream in line 148 before compression and injection into an EOR process to substantially avoid corrosion of injection and compression equipment and souring the hydrocarbons remaining in the injection reservoir.

Figure 3C:
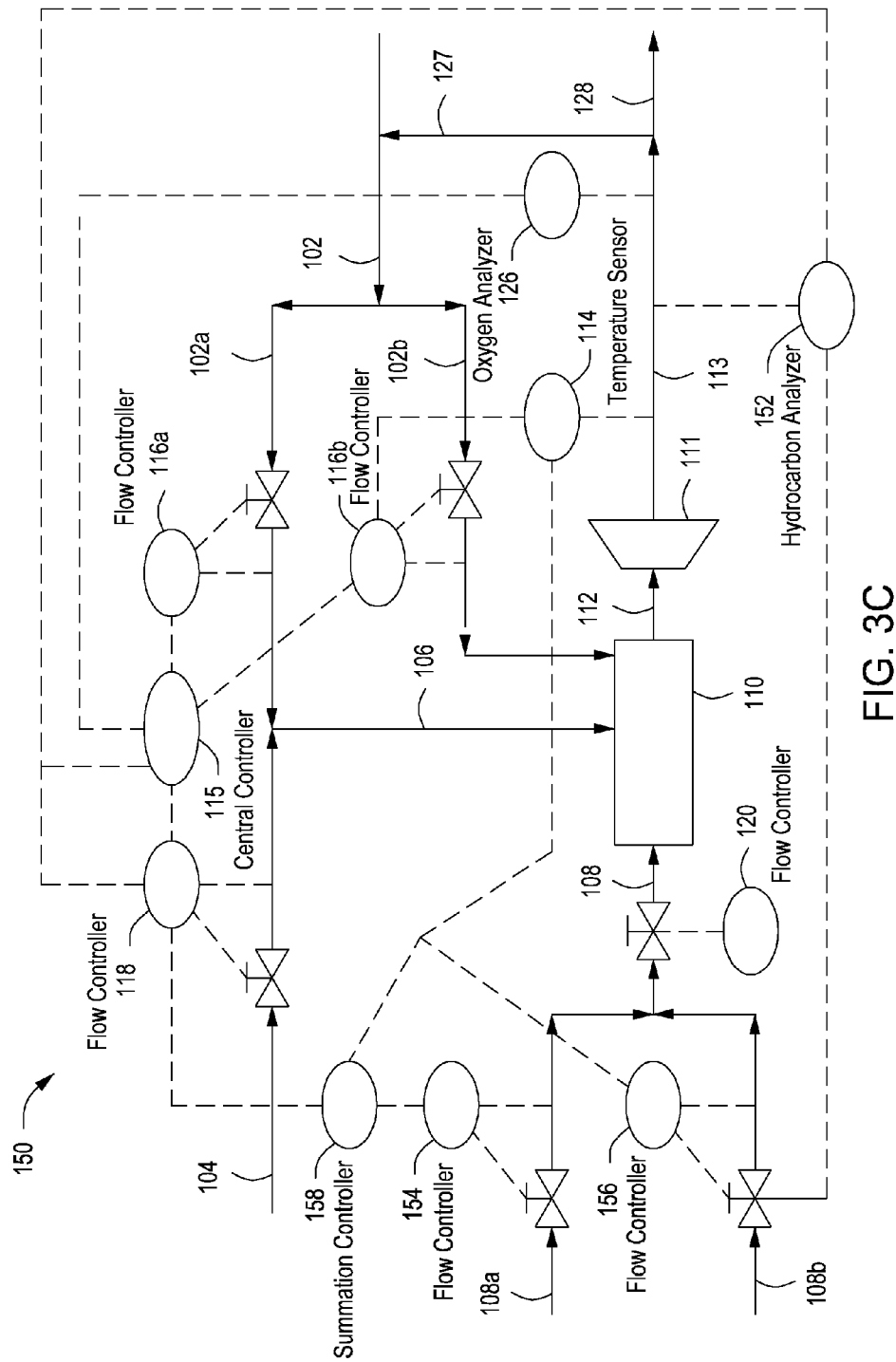

FIG. 3C depicts a schematic of an illustrative combustion system 150 that may or may not include the features discussed and described above with reference to FIG. 3B. As such, FIG. 3C can be best understood with reference to FIGS. 3A and 3B. The combustion system 150 can include a hydrocarbon analyzer 152 configured to measure, determine, detect, or otherwise estimate an amount of hydrocarbons in the combustion products stream in line 112 and/or the expanded combustion products stream in line 113, a first fuel gas stream via line 108a controlled by a flow controller 154, and a second fuel gas stream via line 108b controlled by a flow controller 156. In one or more embodiments, the first fuel gas stream in line 108a can be of higher quality than the second fuel gas stream in line 108b. As such, the first fuel gas stream in line 108a can be referred to as the "high quality fuel gas stream" and the second fuel gas stream in line 108b can be referred to as the "low heating value fuel gas stream." The high quality fuel gas stream via line 108a, the low heating value fuel gas stream via line 108b, or a combination thereof can be introduced to the combustor 110 via line 108. Flow controller 156 can be directly connected to the hydrocarbon analyzer 152 and/or can be connected via central controller 115. The flow controllers 154, 156, and optionally 120, can be operatively connected to a summation controller 158, which can be connected to the central controller 115 directly or via oxygen supply stream controller 118.

The high quality fuel gas stream in line 108a can substantially include methane (e.g., about 99 vol %) and alternatively can be or include a "spiking" fuel gas such as hydrogen, higher hydrocarbons (e.g., $C_2$ and $C_3$+) or any combination thereof. The composition of the high quality fuel gas stream in line 108a can vary depending on the needs of the combustion system 150 and/or on the availability of various fuel types, but preferably will not include significant quantities of inert gases (e.g., nitrogen, carbon dioxide, etc.) or acid gases (e.g., sulfur dioxide, hydrogen sulfide, etc.). The high quality fuel gas stream via line 108a can be provided from any reasonable source, but is preferably available from a nearby gas production field rather than imported from a significant distance. Specifically, if the high quality fuel gas stream in line 108a is hydrogen, it may be provided from an auto-thermal reforming (ATR) process performed on a gas production stream from a nearby gas production field (not shown).

The low heating value fuel gas stream in line 108b can include less than about 80 vol % methane, less than about 60 vol % methane, less than about 40 vol % methane, or even less than about 20 vol % methane. The low heating value stream in line 108b can also include small amounts of heavier hydrocarbons such as ethane, propane, and/or butane, for example. In most cases, the majority of the remainder of the low heating value fuel gas stream 108b can be inert gases such as carbon dioxide, but in some cases, there will be small amounts of nitrogen, hydrogen sulfide, helium, argon, and/or other gases. Preferably, all non-hydrocarbons and all inert gases other than carbon dioxide can be separated out of the low heating value fuel gas stream in line 108b prior to mixing and combustion.

In at least one embodiment, the flow and composition of the two hydrocarbon-containing streams 108a and 108b can be used to calculate the oxygen requirement to operate the combustor 110 and provide the set point for the oxygen supply stream flow controller 118. The calculation can provide the amount of oxygen needed for a stoichiometric combustion in the combustor 110. The flows and compositions of the streams can change over time, depending on the source of the streams 108a and 108b. For example, the low heating value fuel gas stream 108b could originate from an EOR well having a high methane content in early production (e.g., above about 80 vol %). In such a case, there may be little or no flow through the high quality fuel gas stream via line 108a. However, when breakthrough occurs, the flow from the low heating value fuel gas stream via line 108b could include a very low methane concentration (e.g., less than about 20 vol %). In that case, the flow from the high quality fuel gas stream via line 108a can be increased to add hydrocarbons to the combustion fuel stream in line 108.

Figure 3D:
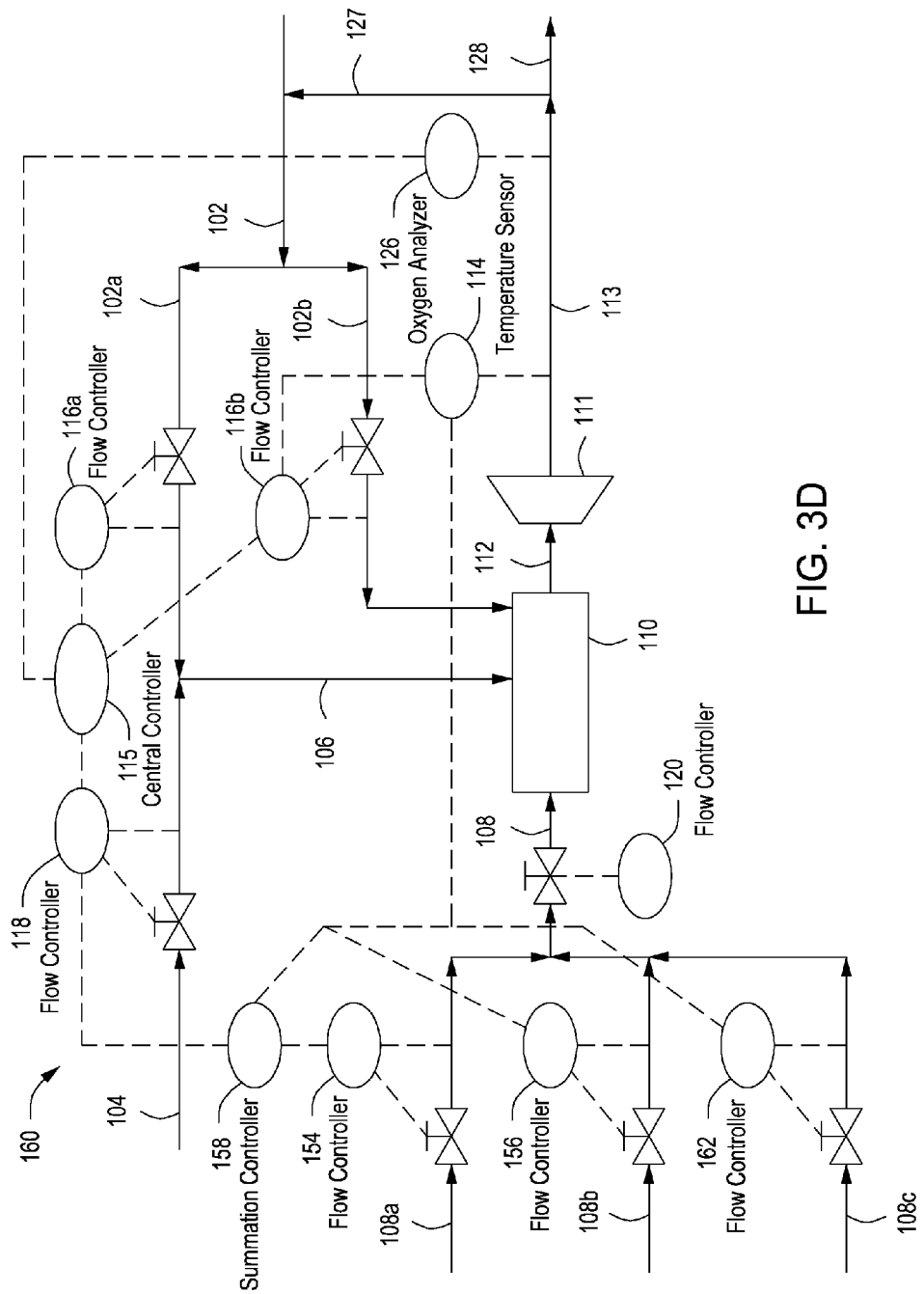

FIG. 3D depicts a schematic of another illustrative combustion system 160, according to one or more embodiments. The combustion system 160 may or may not include the features discussed and described above with reference to FIGS. 3B and 3C. As such, FIG. 3D can be best understood with reference to FIGS. 3A-3C. The combustion system 160 can further include a make-up carbon dioxide stream via line 108c. A flow controller 162 can be operatively attached to or otherwise in communication therewith the make-up carbon dioxide stream in line 108c. The make-up carbon dioxide stream via line 108c can be combined with streams 108a and/or 108b to provide a combustion fuel gas stream via line 108 having a substantially constant composition during operation of the combustion system 160. The approach can be similar to the combustion system 150, but the physical characteristics of the combustor 110 could be designed specifically for the composition of the combustion fuel gas stream in line 108 and still burn fuels that have variable composition 108b. The make-up carbon dioxide stream via line 108c can be split from the combustion products stream in line 112 or originate from another source.

Figure 3E:
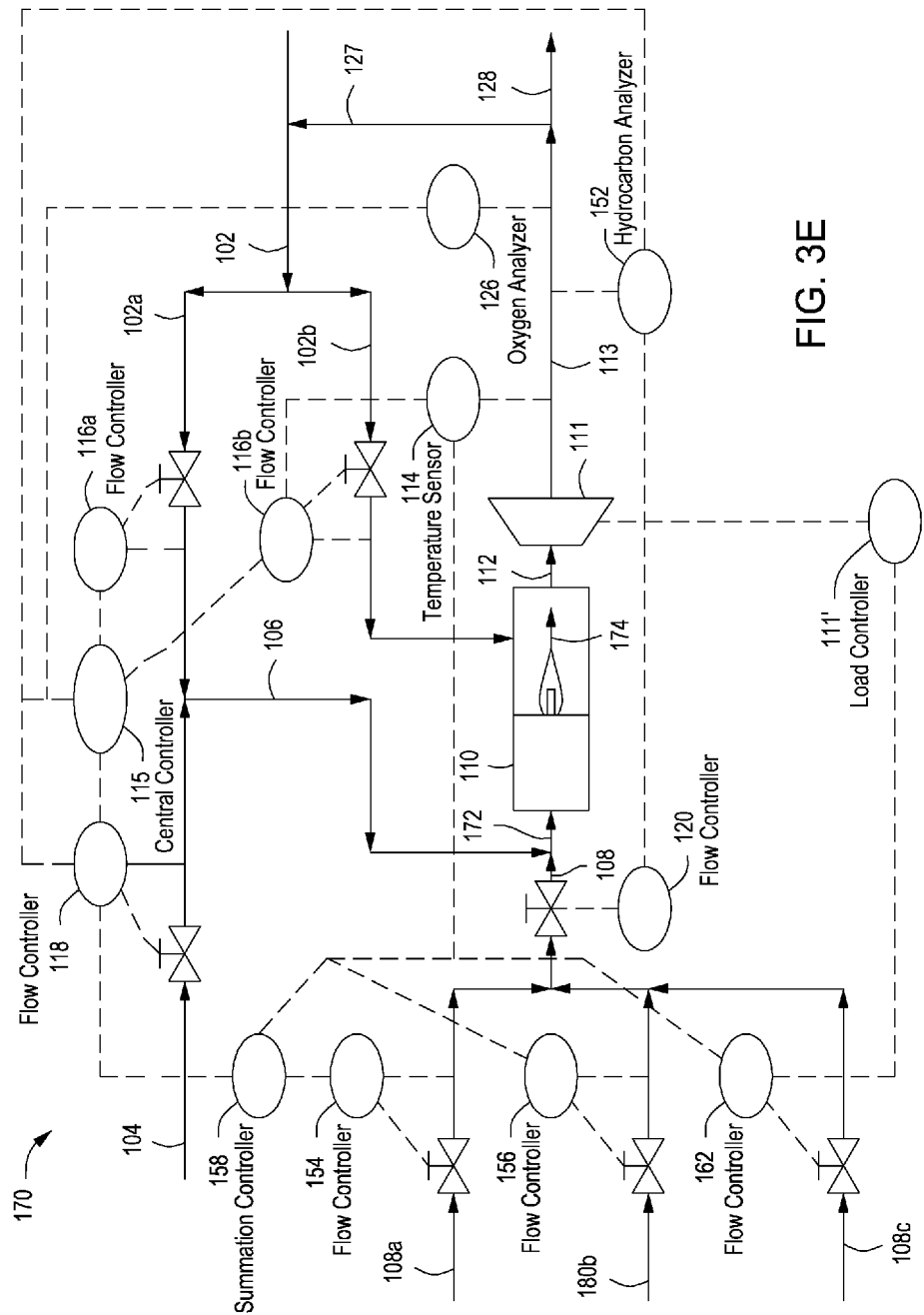

FIG. 3E depicts a schematic of yet another illustrative combustion system 170, according to one or more embodiments. The combustion system 170 may or may not include the features discussed and described above with reference to FIGS. 3B-3D. As such, FIG. 3E can be best understood with reference to FIGS. 3A-3D. The combustion system 170 can include a combustion fuel stream via line 108 that substantially includes hydrocarbons and carbon dioxide and having an initial fuel-to-carbon dioxide ratio; an oxygenation stream via line 106 comprising substantially oxygen and carbon dioxide, where the combustion fuel stream via line 108 and the oxygenation stream via line 106 are combined to form a combustor inlet stream via line 172 having a combined fuel-to-oxygen ratio configured to meet an optimal equivalence ratio ($\phi$) and a combined initial carbon dioxide-to-fuel ratio configured to provide an optimal combustion temperature; a diluent stream comprising substantially carbon dioxide 102b; and a combustor 110 configured to at least partially combust the combustor inlet stream 172 to produce a hot products stream via line 174 that substantially contains water and carbon dioxide, where the hot products stream via line 174 can be mixed with the diluent stream 102b to form a combustion products stream 112 having a temperature and a final carbon dioxide-to-fuel ratio.

In one or more embodiments, the hydrocarbons in the combustion fuel stream 108 can include methane and the fuel-to-oxygen ratio can range from about 0.9:1 mol fuel to mol oxygen to about 1.1:1 mol fuel to mol oxygen or from about 0.95:1 mol fuel to mol oxygen to about 1.05:1 mol fuel to mol oxygen. In another embodiment, the hydrocarbons in the combustion fuel stream in line 108 can include methane and a carbon dioxide-to-fuel ratio of from about 20:1 mol carbon dioxide to mol fuel to about 25:1 mol carbon dioxide to mol fuel or from about 23:1 mol carbon dioxide to mol fuel to about 24:1 mol carbon dioxide to mol fuel.

In at least one specific embodiment, the combustion system 170 can further include a high quality fuel gas stream via line 108a, a low heating value fuel gas stream via line 108b, and a make-up carbon dioxide stream via line 108c configured to combine with the high quality fuel gas stream in line 108a and the low heating value fuel gas stream in line 108b to form the combustion fuel stream via line 108 and maintain a constant initial fuel-to-carbon dioxide ratio of the combustion fuel stream in line 108. Additional embodiments can include an oxygen supply stream via line 104 and a carbon dioxide mixing stream via line 102a with a flow and a composition configured to combine with the oxygen supply stream in line 104 to form the oxygenation stream via line 106.

In yet another embodiment, the combustion system 170 can include at least one temperature sensor 114 configured to measure the temperature of the expanded combustion products stream in line 113 (and optionally the combustion products stream in line 112). The temperature of the expanded combustion products stream in line 113 can be used to calculate the flow rate of at least one of the carbon dioxide mixing stream via line 102a, the make-up carbon dioxide stream via line 108c, and the diluent stream via line 102b, to regulate the temperature of combustion. The combustion system 170 can also include at least one oxygen analyzer 126 configured to measure the amount of oxygen in the combustion products stream in line 112 and/or the expanded combustion products stream in line 113. The amount of oxygen in the combustion products stream in line 108 can be used to optimize the flow rate of the oxygen supply stream via line 104 to achieve substantially stoichiometric combustion. The system 170 can further include at least one hydrocarbon analyzer 152 configured to measure the amount of hydrocarbons in the composition of the combustion products stream in line 112 and/or the expanded combustion products stream in line 113. The amount of hydrocarbons in the composition of the combustion products stream in line 112 and/or the expanded combustion products stream in line 113 can be used to optimize the flow rate of the oxygen supply stream in line 104 to achieve substantially stoichiometric combustion. The combustion system 170 can also include an expander 111 having a load and a load controller 111' configured to measure the load. The load controller 111' can be used to maintain the combined fuel-to-oxygen ratio as the load changes.

Figure 3F:
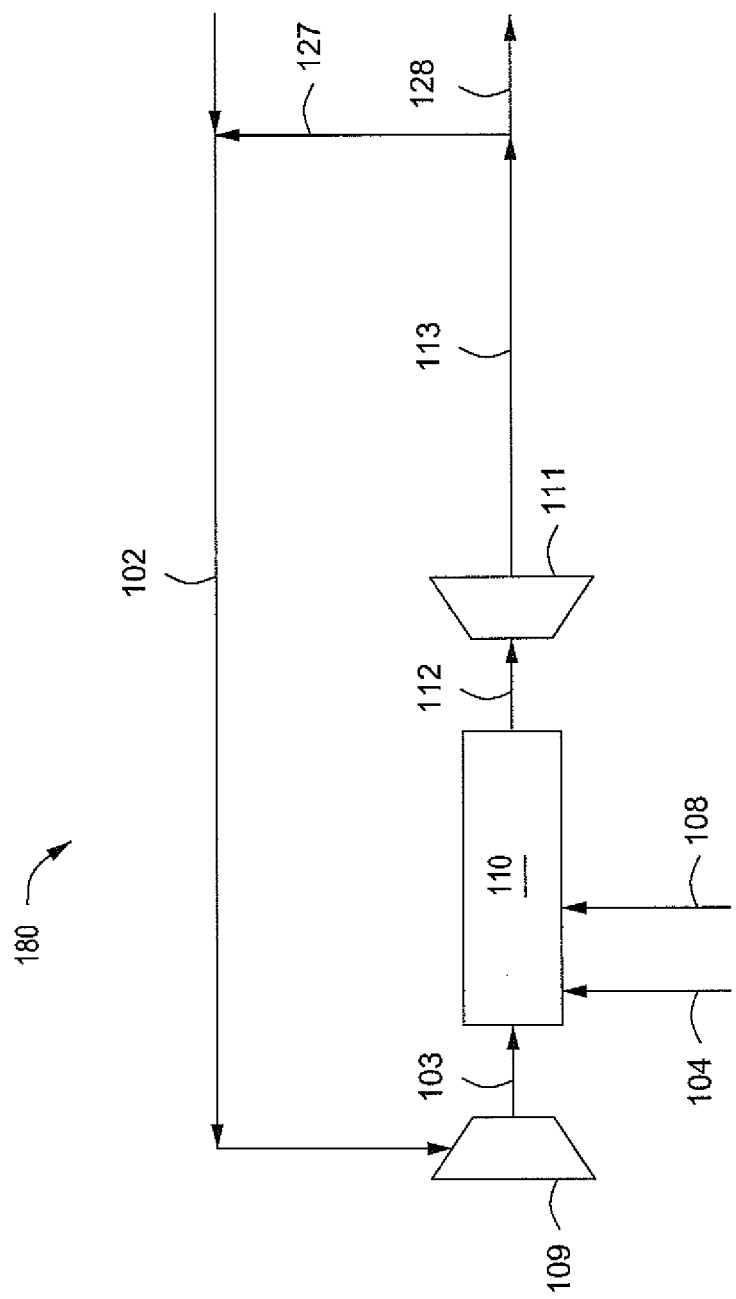

FIG. 3F depicts a schematic of still another illustrative combustion system 180, according to one or more embodiments. The combustion system 180 may or may not include the features discussed and described above with reference to FIGS. 3A-3E. As such, FIG. 3F can be best understood with reference to FIGS. 3A-3E. The combustion system 180 is shown without sensors and controllers for improved clarity, but it should be understood that the combustion system 180 can include sensors and controllers as shown in FIGS. 3A-3E. The combustion system 180 can include a carbon dioxide stream via line 102 that can be introduced to a compressor 109 to produce a compressed carbon dioxide stream via line 103. The compressed carbon dioxide stream via line 103 can be introduced to the combustor 110. The oxygen supply stream via line 104 and the combustion fuel stream via line 108, which may be a combination of streams, as discussed and described above with reference to FIGS. 3C-3E, can also be introduced to the combustor 110.

Figure 4A:
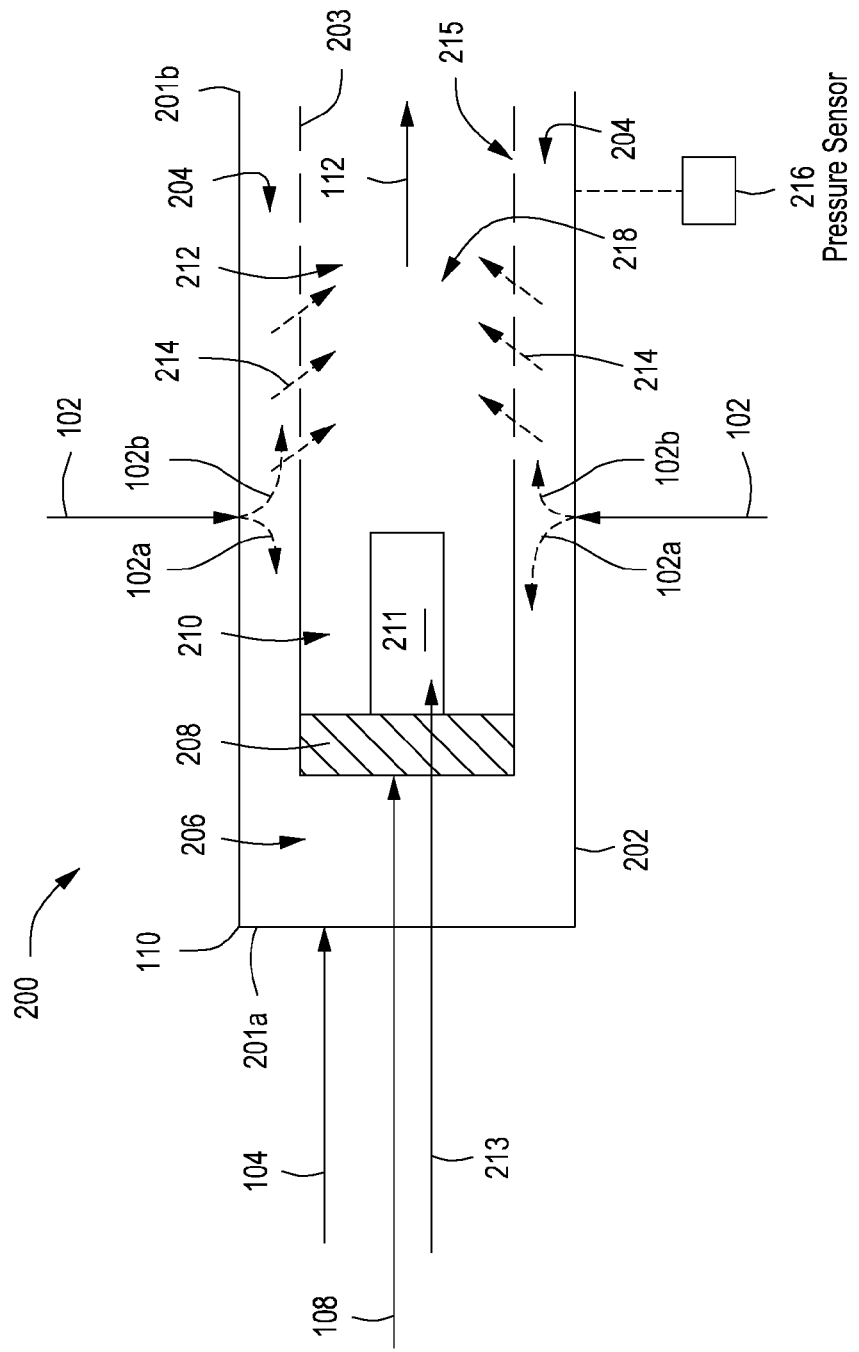
FIGS. 4A-4C depict three illustrative combustors that can be used in combination with the systems depicted in FIGS. 3A-3F, according to one or more embodiments described.
Figure 4B:
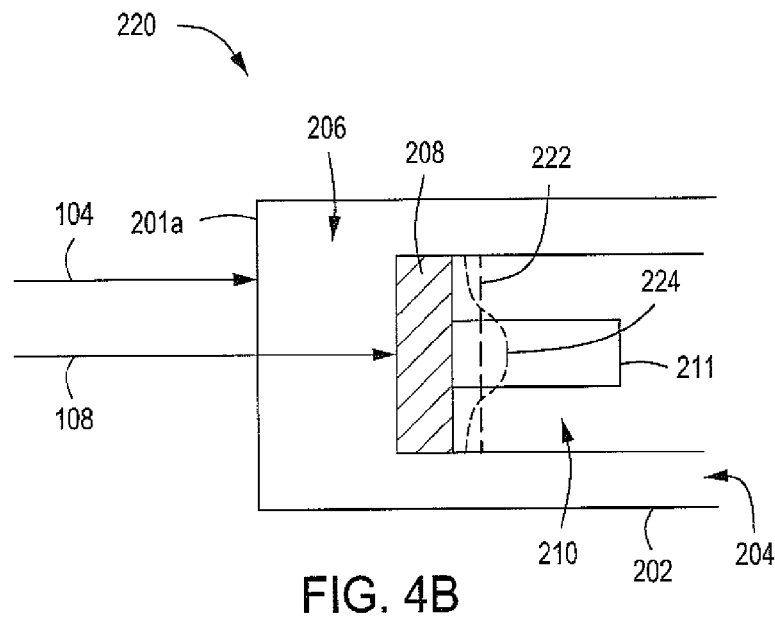
Figure 4C:
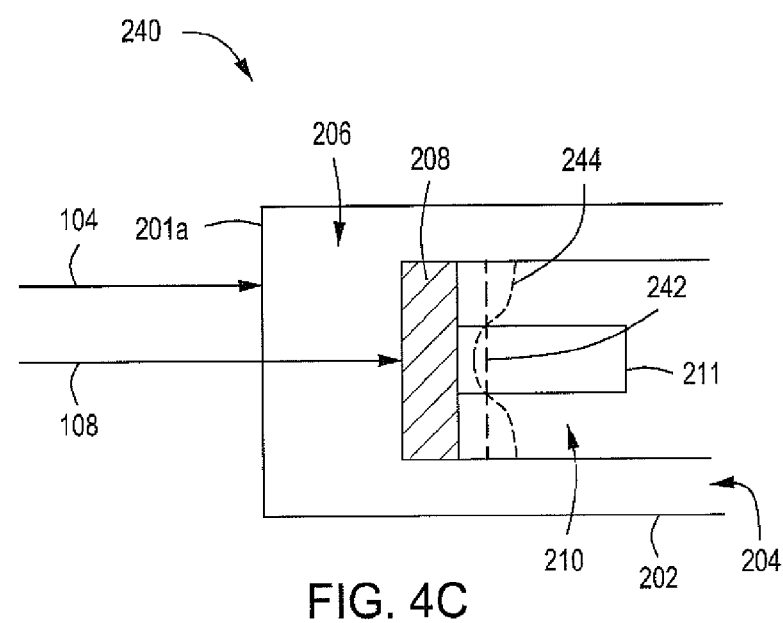

FIGS. 4A-4C depict three illustrative combustor systems 200, 220, 240, respectively, that can be used in combination with the systems depicted in FIGS. 3A-3F, according to one or more embodiments. Any one or more of the combustor systems 200, 220, 240 can be used in combination with the combustion systems 100, 140, 150, 160, 170, and 180 discussed and described above with reference to FIGS. 3A-3F. As such, FIGS. 4A-4C can be best understood with reference to FIGS. 3A-3F.

The combustor system 200 can have a first end 201a, a second end 201b, an outer shell 202, a combustor liner 203, an annular volume 204 disposed between the outer shell 202 and the combustor liner 203, a first mixing zone 206, a second mixing zone 208, a combustion zone 210, a burnout zone 212, and a plurality of openings 213 disposed through the combustion liner 203. The combustor system 200 can also include a sensor 216 configured to monitor and measure or otherwise estimate pressure oscillations within the combustor 110. The combustor system 200 can be configured to receive the carbon dioxide stream via line 102, which may be split within the combustor 110. For example, a first portion of the carbon dioxide stream in line 102 (depicted as dotted line 102a) can be mixed, contacted, or otherwise combined with the oxygen supply stream introduced via line 104 to form an oxygenation stream in the first mixing zone 206. A second portion of the carbon dioxide stream in line 102 (depicted as dotted line 102b) can be used as a cooling stream 214. The carbon dioxide used as the cooling stream 214 can flow through the openings 213 disposed through the combustion liner 203 and into the burnout zone 212. The combustion fuel stream via line 108 can also be introduced to the combustor 110 and mixed with the oxygenation stream in the second mixing zone 208 to form a mixed combustion stream that can be at least partially combusted in the combustion zone 210 to form the combustion products stream 112. In at least one embodiment, the combustion system 200 can further include a hot flame zone 211.

FIG. 4B depicts an illustrative combustor system 220 having an exemplary carbon dioxide profile 222 and oxygen profile 224 over a cross-section of the combustion zone 210 that would produce a relatively hotter flame zone in the center, i.e. the hot flame zone 211. FIG. 4B is representative of a case where a higher flow rate of oxygen 224 is injected near the center of the second mixing zone 208 versus an outer perimeter of the second mixing zone 208 while the carbon dioxide flow rate 222 is constant over the cross section of the second mixing zone 208. The opposite is true in FIG. 4C, which depicts a combustor system 240 having an oxygen flow rate 242 that is constant over the cross section of the second mixing zone 208 and a carbon dioxide flow rate 244 that is reduced toward the center of the second mixing zone 208 versus an outer perimeter of the second mixing zone 208. Note that in both cases the total molar ratio of oxygen-to-carbon dioxide introduced to the combustion zone 210 can be the same. The oxygen-to-carbon dioxide molar ratio can range from about 0.2:1 to about 0.5:1.

Referring again to FIG. 4A, the hot flame zone 211 can be configured to increase flame stability within the combustion zone 210. This approach can allow the amount of fuel via line 108 to be varied across the face of an individual nozzle while maintaining a global stoichiometry within the combustion zone 210 near an equivalence ratio ($\phi$) of about 1, for example from about 0.95 to about 1.05. Such an arrangement allows localized variation of a) the stoichiometry or b) the carbon dioxide-to-oxygen ratio that balances the dual requirements of flame stability and combustion liner material limitations. For example, in combustor designs or configurations that include multiple nozzles per combustor system 200, the hot flame zone 211 can be used to vary the local stoichiometry across the face of each nozzle independently or across the face of the entire second mixing zone 208. Note, that although the hot flame zone 211 is shown approximately in the center of the combustion zone 210, it is contemplated that the hot flame zone 211 can be off-center and that there can be more than one hot flame zone 211.

In one or more embodiments, the combustor system 200 can be configured to include a stable hot flame zone 211 with rich mixtures of the combustion fuel stream 108 with an oxygenation stream (or synair stream) or the combustion fuel stream 108 and the oxygen supply stream 104. The hot flame zone 211 could provide a hot core flame that can assist in overall flame stability. The combustion products and unburned fuel from the hot flame zone 211 could be more completely oxidized further downstream in the combustor 110 where excess oxygen or synair could be present. The global stoichiometry of the combustor 110 can be maintained near an equivalence ratio ($\phi$) of about 1, for example from about 0.95 to about 1.05.

In one or more embodiments, the combustor system 200 can include multiple second mixing zones 208, combustion zones 210, and/or fuel/oxygen injectors, any one or more of which can be capable of independent modulation. The arrangement could be in series or parallel and could allow for global flame stability to be maintained by modulating one or more of the second mixing zones 208 independently of the others. Turndown could also be obtained by shutting off one or more of the second mixing zones 208 while maintaining a stable flame in the combustor system 200.

In still other embodiments, the combustor system 200 can have a geometry designed to take advantage of the higher emissivity and absorption characteristics of carbon dioxide. The geometry can incorporate a long optical path length between the incoming reactants (oxygen supply stream 104 and combustion fuel stream 108) and the flame (in the combustion zone 210) downstream. The high temperatures from the flame could radiantly heat the reactants to preheat them. In addition to or in the alternative, the nozzle or combustor wall can be made of a material that radiates at a wavelength that is preferentially absorbed by carbon dioxide. This configuration would transfer heat from the material to the carbon dioxide and raise the temperature of the carbon dioxide stream introduced via line 102, which could improve the efficiency of the combustion reaction. In still another optional variation, a flame holder constructed of a material that preferentially absorbs at wavelengths emitted by carbon dioxide can be included. This could cause the material to heat up and preheat the reactants through convection.

Another beneficial outcome of the combustor system 200 can include the use of a carbon dioxide/oxygen (synair or oxygenation stream) versus natural air, which aids in the combustor design due to the higher density of synair versus natural air. The molecular weight of carbon dioxide is greater than nitrogen which results in an increase in density and leads to a lower velocity for the same mass flow rate. The reduced velocities at the burner face (for a burner with the same power density) aids in flame stabilization. This advantage helps offset the reduced flame speeds of flames in a carbon dioxide/oxygen (synair or oxygenation stream). The disclosed designs can also aid in overall flame stability by preheating the reactants and/or aid in cooling the combustor by efficiently transferring heat to the gas streams.

In still another embodiment, the combustor system 200 can include one or more gas injection devices that can receive a gas via line 215. The gas in line 215 be introduced through the gas injection device to the hot flame zone 211. The gas can include, but is not limited to, oxygen, carbon dioxide, combustion fuel, or any combination thereof. Introducing the gas in line 215 the hot flame zone can provide an anchor flame upstream of the combustion zone configured to increase flame stability in the combustion zone 210.

Figure 5A:
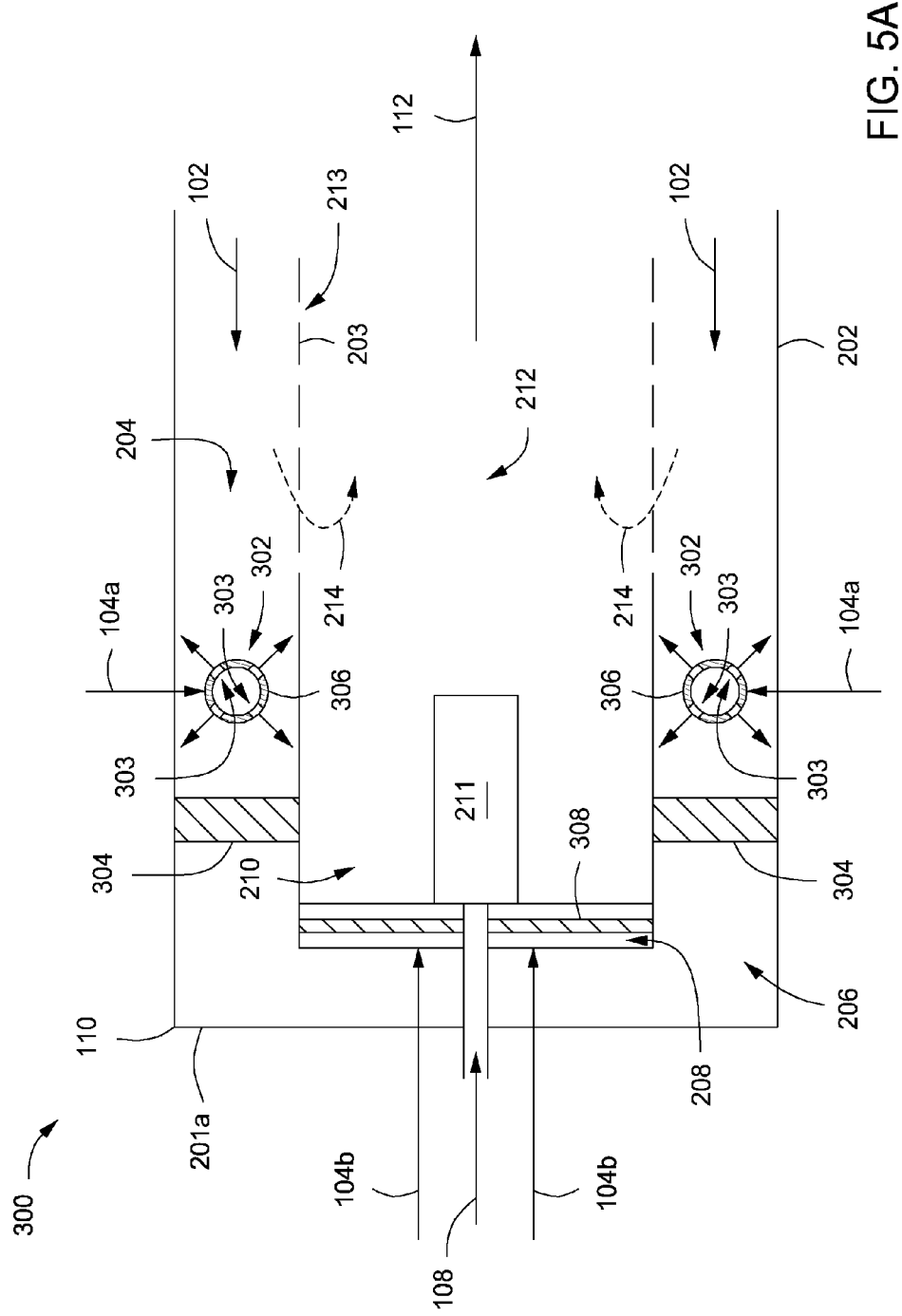
FIGS. 5A and 5B depict illustrative combustor configurations of the combustors depicted in FIGS. 4A-4C, according to one or more embodiments described.
Figure 5B:
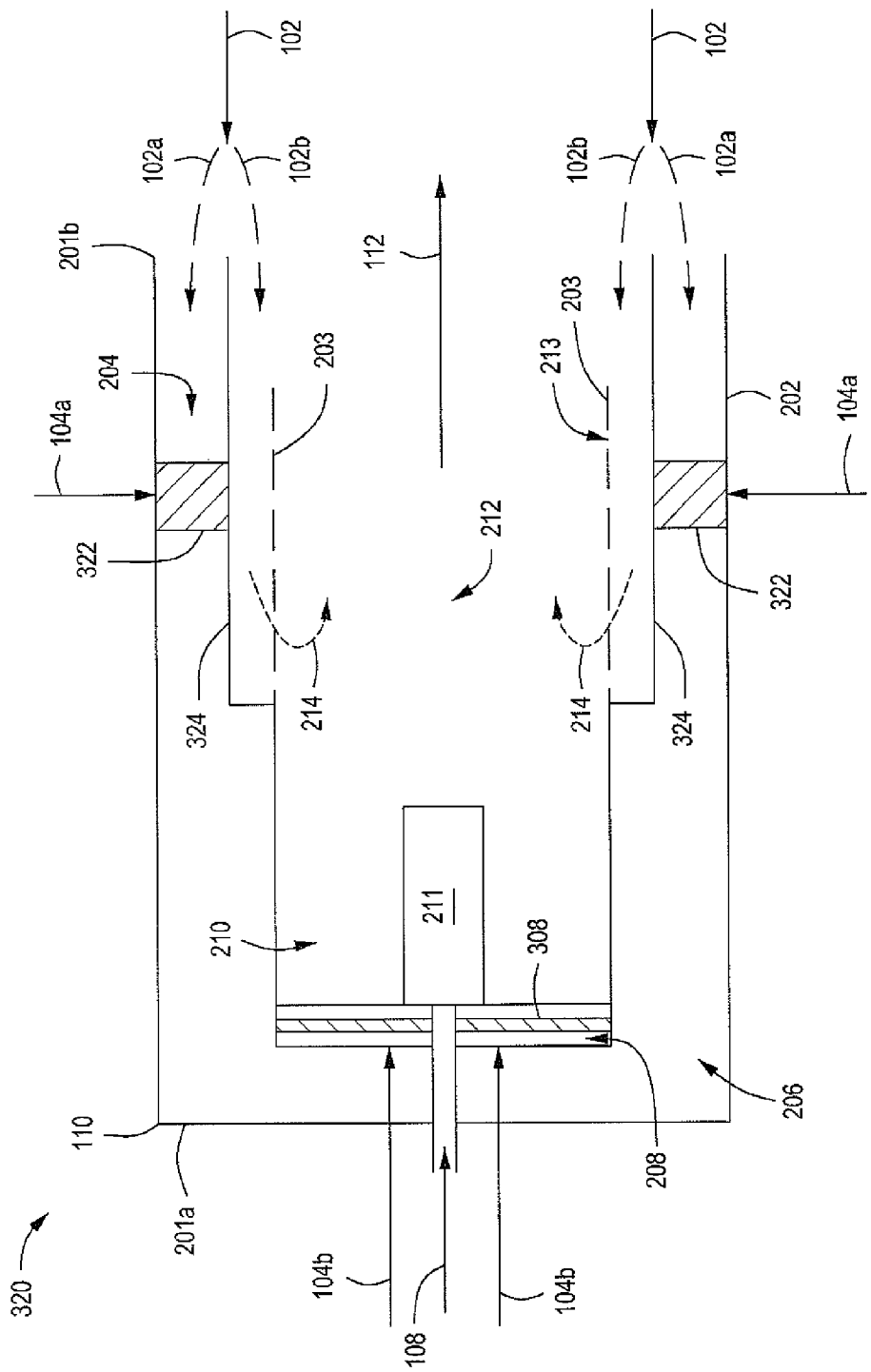

FIGS. 5A and 5B depict illustrative combustor configurations 300, 320, respectively, of the combustors depicted in FIGS. 4A-4C, according to one or more embodiments. As such, FIGS. 5A and 5B can be best understood with reference to FIGS. 4A-4C. The combustor configuration 300 includes a first oxygen supply stream via line 104a introduced into the annular volume 204 via injectors 302. The oxygen supply stream introduced via line 104a can mixed in zone 206 with the carbon dioxide 102, combustion fuel introduced via line 108, and a second oxygen supply stream introduced via line 104b.

In one or more embodiments, a mixing device 304 can be disposed within the first mixing zone 206. The mixing device 304 can be a swirler, mixing vanes, wire mesh, or some other device configured to mix gaseous streams. The injectors 302 can be a plurality of injector holes 303 located on a wall of the combustor 110 or on a ring 306 disposed within the annular volume 204 to create a number of highly turbulent jets of oxygen. A ring configuration can be or include a segmented ring or a continuous ring. Further, the ring 306 can have a circular, wedge type, or other bluff body cross-sectional shape. Smaller jets generally can lead to better mixing over a shorter length. It can be desirable to have nearly complete mixing by the time the synair (carbon dioxide/oxygen mixture) reaches the point of fuel injection at the second mixing zone 208 to promote complete combustion and a stoichiometric reaction.

The second mixing zone 208 can be where the combustion fuel stream 108 is introduced. A second mixing device 308 can be disposed within the second mixing zone 208. The second mixing device 308 can be a swirler, mixing vanes, wire mesh, or some other device configured to create a low velocity region for flame holding. The combustion fuel stream 108 can be injected into the swirling flow and a flame can be held or maintained in the combustion zone 210. The fuel injector shown in the combustor arrangement 300 is a simplified schematic and could include a plurality of holes or injector openings. The cooling stream 214 can include carbon dioxide introduced via line 102 to the annular region 204. The combustion products stream 112 can be introduced to the expander 111 (see, e.g., FIG. 3A).

FIG. 5B depicts an illustrative alternative combustor configuration 320 that can include a secondary inner shell or secondary combustion liner 324. The secondary inner shell 324 can be disposed about the combustion liner 203 from a location intermediate the first end 201a and the second end 201b and can extend toward the second end 201b. In at least one example, the secondary inner shell 324 can extend from the location intermediate the first end 201a and the second end 201b to the second end 201b. The combustor arrangement 320 can also include one or more mixers 322 disposed within the annular volume 204. The mixers 322 can be located closer to the second end 201b of the combustor arrangement 320 than in the combustor configuration 300. It should be noted that the oxygen supply stream via line 104 cannot enter the dilution stream 214, as it would react with the combustion products within the burnout zone 212. Hence, the secondary liner 324 beneficially permits a longer mixing zone 206 and avoids introducing oxygen into the dilution or cooling stream 214.

In another embodiment, the oxygen supply stream in line 104 can be introduced at two locations 104a and 104b. Introducing the oxygen supply stream via lines 104a and 104b can permit a spatial variation of the oxygen-to-carbon dioxide ratio in the oxygenation stream to provide a hot flame zone 211 in the combustion zone 210.

One or more mixers (two are shown, 402a and 402b) can be disposed within the first mixing zone 206. The mixers 402a and 402b can have the same or similar geometry. Alternatively, the mixer 402b can have a different geometry from the mixer 402a to change the ratio of oxygen-to-carbon dioxide across the face of the second mixing zone 208. For example, each mixer 402a and 402b can be a variable geometry mixing device positioned in the first mixing zone 206 configured to spatially vary the ratio of oxygen- to-carbon dioxide in the first mixture.

More particularly, as shown there are two stages of mixing: the first mixing zone or first stage 206 for mixing oxygen and carbon dioxide to make synthetic air (an oxygenation stream) and the second mixing zone or second stage 208 for mixing the combustion fuel stream 108 with the synthetic air to produce the combustion stream. The oxygen supply stream via line 104 can be injected into the carbon dioxide stream 102 and the mixing can be facilitated using swirler vanes, bluff body injectors, or wire mesh, for example, to generate turbulence. The mixing between oxygen and carbon dioxide takes place in the first mixing zone 206 and the length of the first mixing zone 206 can be sized to complete this mixing. The combustion fuel stream via line 108 can be injected through a fuel injector, which is shown as a single tube 605, which will feed a series of injector holes at the tip of the tube 605. Combustion takes place in the combustion zone 210 and the walls can be cooled via carbon dioxide introduced via line 102.

In one or more embodiments, the combustor system 400 can vary the pressure drop across the area of the mixers 402a and/or 402b so that the mixture in the middle of the first mixing zone 206 has a higher oxygen/carbon dioxide ratio than the outer portion of the mixing zone. This can produce a hotter flame temperature near the center of the combustion zone 210 and cooler temperatures near the walls of the combustor 400. This is suggested by the higher mesh density on the synair mixer/swirler 402b which inhibits the flow of carbon dioxide versus oxygen into that region.

Figure 6A:
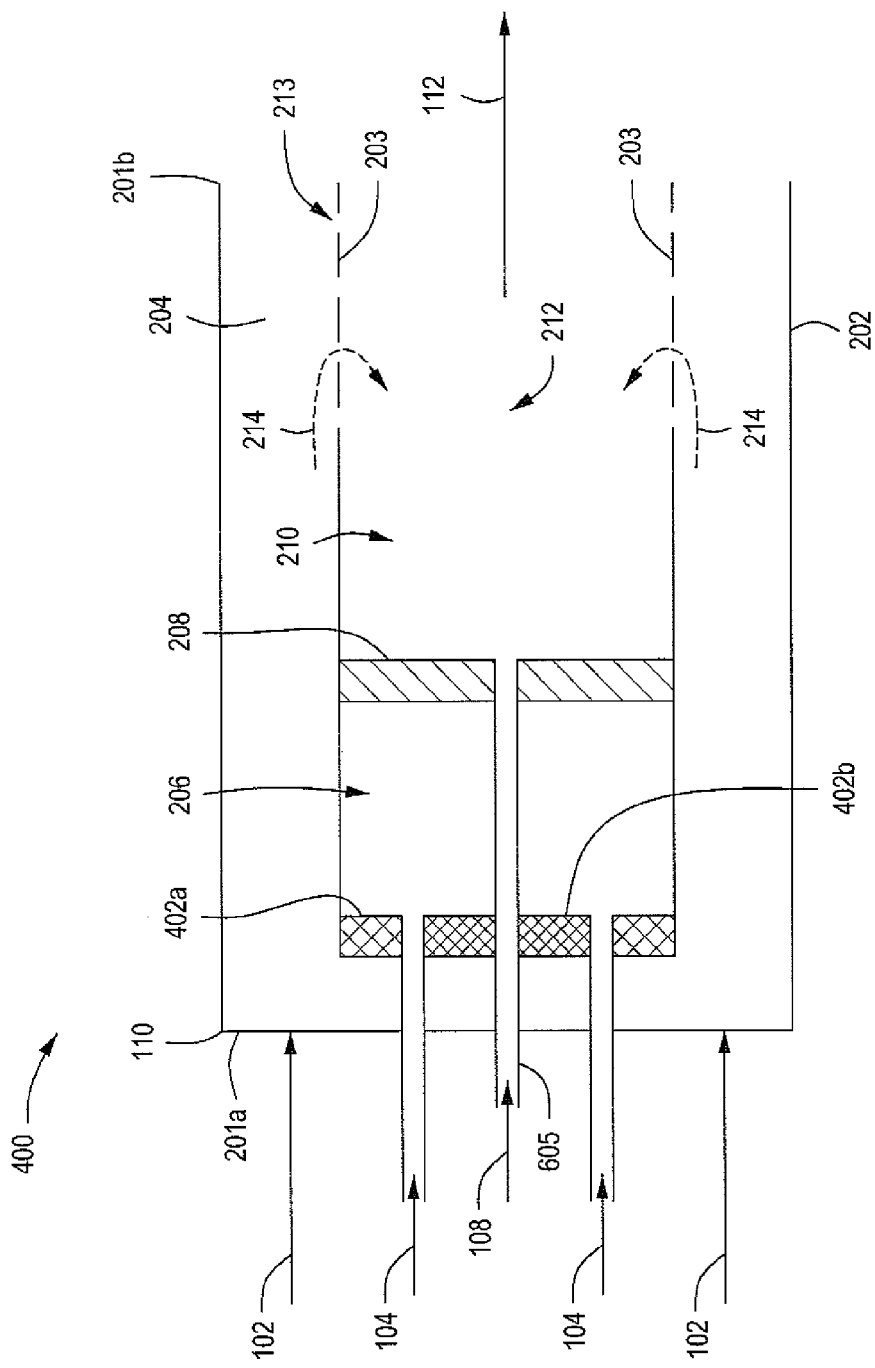
FIGS. 6A and 6B depict illustrative alternative embodiments of the combustors depicted in FIGS. 4A-4C, according to one or more embodiments described.
Figure 6B:
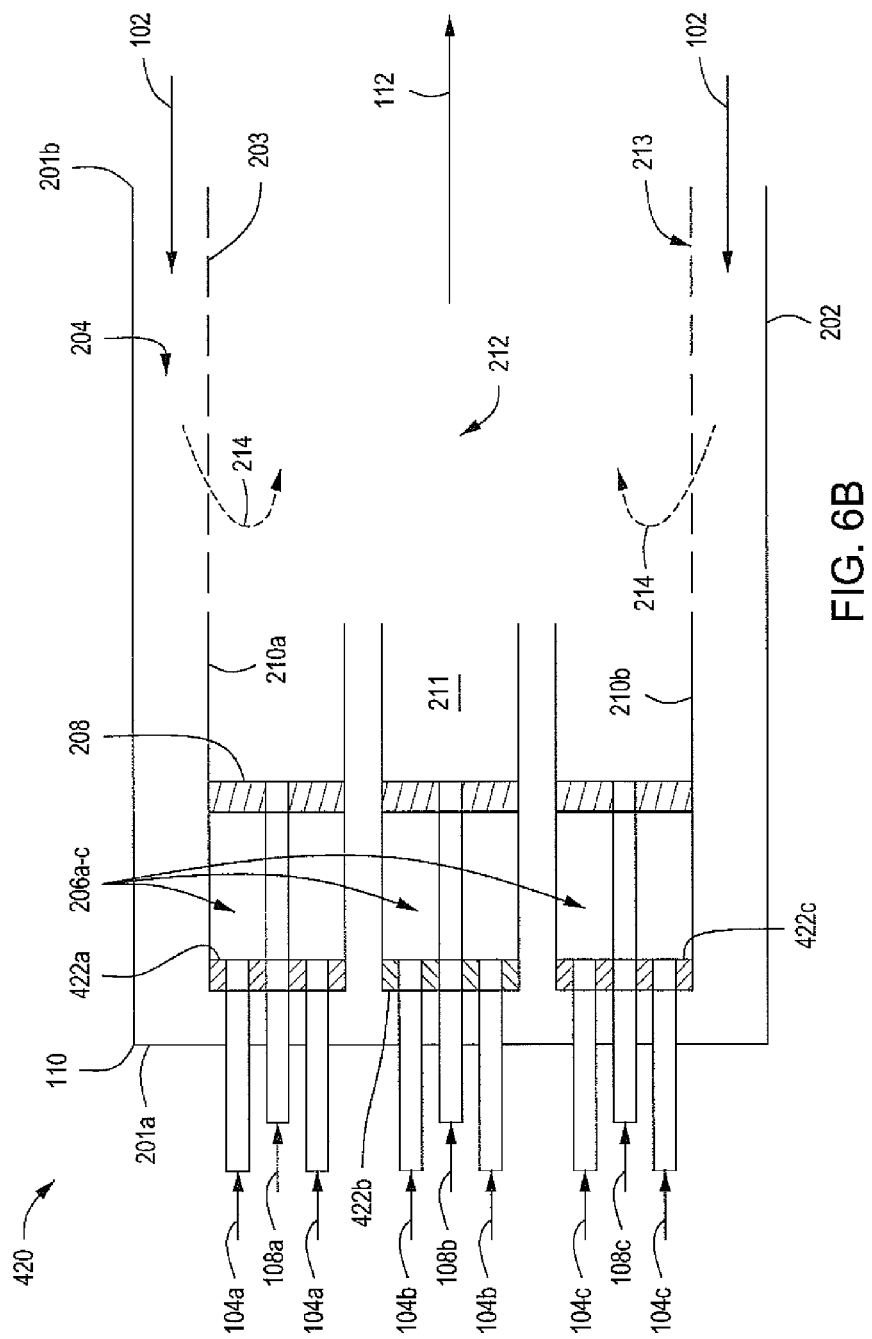

FIG. 6B depicts another embodiment where multiple nozzles 108a-c and 104a-c are used in a single combustor 420. This allows for individual nozzles to be turned on or off as the load in the combustor 420 varies. It also allows for each nozzle to have different swirlers 422a-422c in the first mixing zones 206a-206c so that the oxygen/carbon dioxide ratio can be higher near the middle of the combustor 211 to improve flame stability and lower near the walls 210a-210b.

Figure 7A:
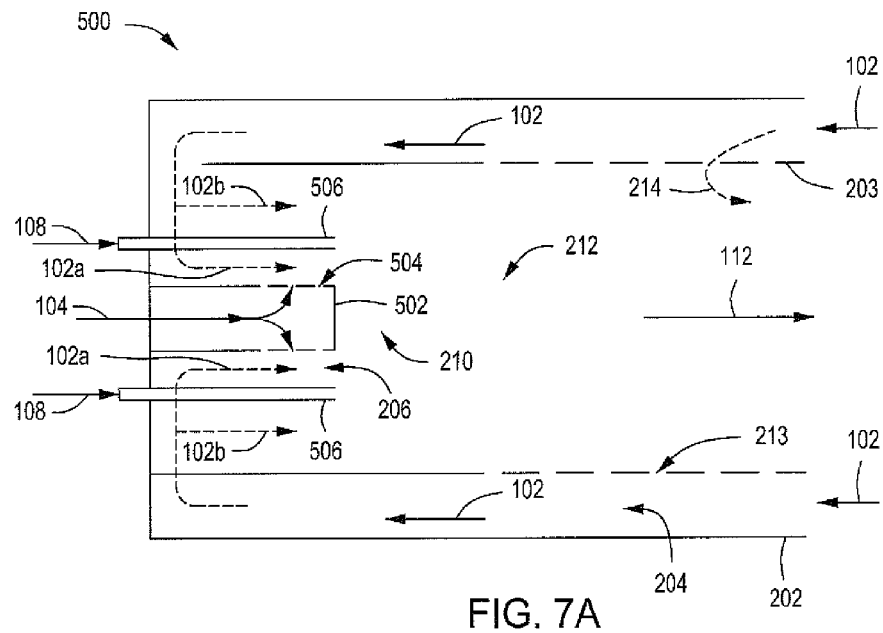
FIGS. 7A-7D depict additional alternative embodiments of the combustors depicted in FIGS. 4A-4C, according to one or more embodiments described.

FIGS. 7A-7D depict additional alternative embodiments of the combustors depicted in FIGS. 4A-4C, according to one or more embodiments. As such, FIGS. 7A-7D can be best understood with reference to FIGS. 4A-4C. FIG. 7A depicts an illustrative combustor 500 that includes a split of the carbon dioxide stream 102, where a first portion 102b is routed along the walls of the combustor 500 for cooling while a second portion 102a is routed through an annulus around a central lance or "swirl inducer" 502. The central lance 502 has side injectors for oxygen 504. The oxygen can be introduced tangentially into the substantially axially flowing carbon dioxide stream 102a. This arrangement can enhance the mixing between the oxygen and carbon dioxide and produce a swirling synair stream. Multiple oxygen injection locations can be included to allow for an independent modulation of both the oxygen mass flow rate and swirl of the synair stream. The swirl inducer 502 can also act as a bluff body in a swirling co-flow and provides reduced velocities in its wake. These zones of reduced velocities aid in flame stability. The combustion fuel via line 108 can be introduced in an annulus around the inner carbon dioxide stream via injector 506, where an end of the fuel injector 506 is flush with the end of the swirl inducer 502.

Figure 7B:
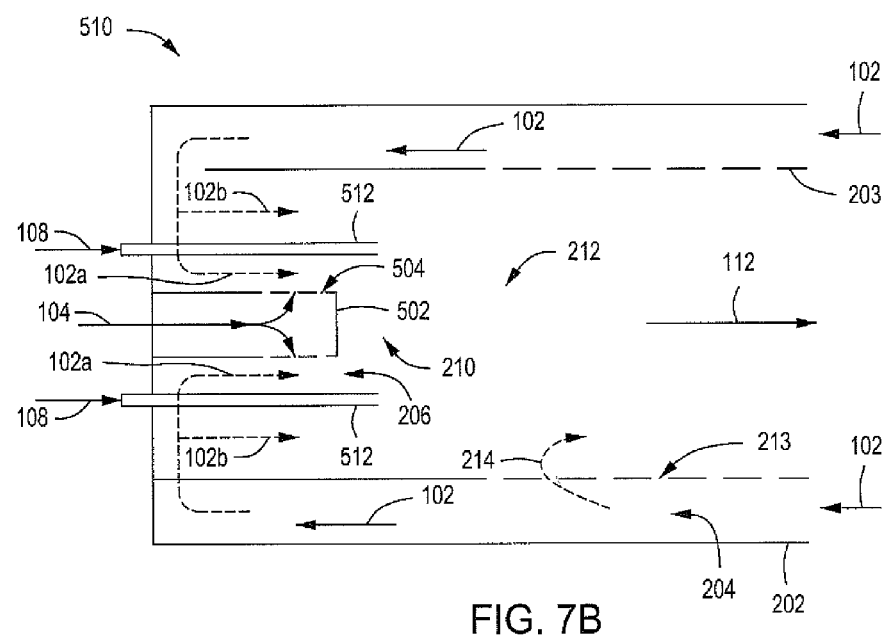

An exemplary modification of this arrangement can be as depicted in combustor 510, shown in FIG. 7B. A fuel annulus 512 can extend downstream past the end of the swirl inducer 502 in the combustor 510. The combustor 510 can provide increased residence times for the carbon dioxide and oxygen streams to mix. This configuration can also be modified to introduce the fuel radially inward rather than axially downstream. This beneficially keeps the flame contained near the center and in the wake of the swirl inducer 502. This can also prevent the outer most annulus of carbon dioxide 102b from quenching the flame or transporting unburnt fuel. In the configurations for the combustors 500 and 510, the outer most annulus of carbon dioxide 102b can prevent the flames from impinging on the walls of the combustors 500, 510 thereby preventing damage to the combustor 500, 510 walls.

Beneficially, the use of the swirl inducer 502 can reduce the pressure drop of the combustor typically associated with swirl vanes. Also, a clear optical path is provided between the flame and the incoming carbon dioxide 102a stream that allows for the higher absorption of the carbon dioxide to be harnessed. Therefore, the incoming synair stream could be preheated to a higher temperature than in a standard combustor utilizing air. It should be noted, however, that the swirl inducer arrangement of combustor 500 is configured to include substantially all of the oxygen supply stream 104 in the first mixing zone 206 and may not be readily able to vary the spatial ratio of oxygen-to-carbon dioxide within the combustion zone 210.

Figure 7C:
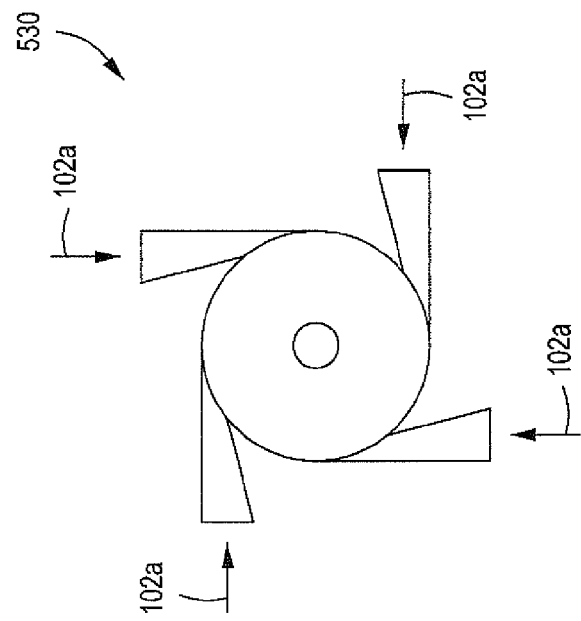
Figure 7D:
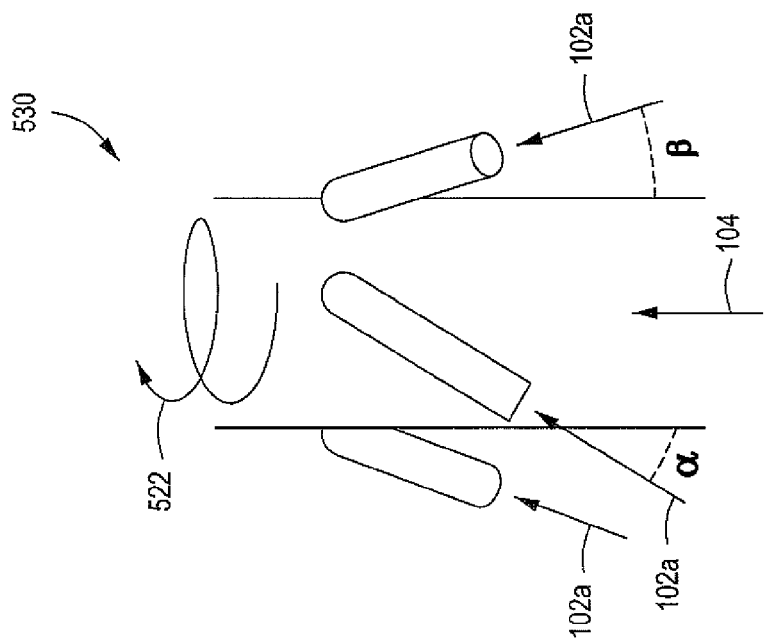

FIGS. 7C and 7D depict side and top views, respectively, of another illustrative swirl inducer 530. In one or more embodiments, the swirl inducer 530 can have a configuration where the carbon dioxide stream 102a is injected tangentially into the oxygen stream 104 to produce a swirling first mixture 522 (oxygenation or synair stream) that includes oxygen and carbon dioxide. The angles of injection ($\alpha$) and ($\beta$) can be varied to balance the characteristics of the aerodynamic blockage with the mixing length. The angle of injection ($\alpha$) can range from a low of about 1°, about 5°, about 10°, about 20°, or about 30° to a high of about 50°, about 60°, about 70°, about 80°, or about 90° with respect to a longitudinal central axis disposed through the swirl inducer 530. The angle of injection ($\beta$) can range from a low of about 1°, about 5°, about 10°, about 20°, or about 30° to a high of about 50°, about 60°, about 70°, about 80°, or about 90° with respect to a longitudinal central axis disposed through the swirl inducer 530. In one or more embodiments, the introduction of the oxygen stream 104 and the carbon dioxide stream 102a to the swirl inducer 530 could be reversed. In other words, the oxygen stream 104 could be injected tangentially into the carbon dioxide stream 102a to create the swirling first mixture 522 (oxygenation or synair stream).

Figure 8A:
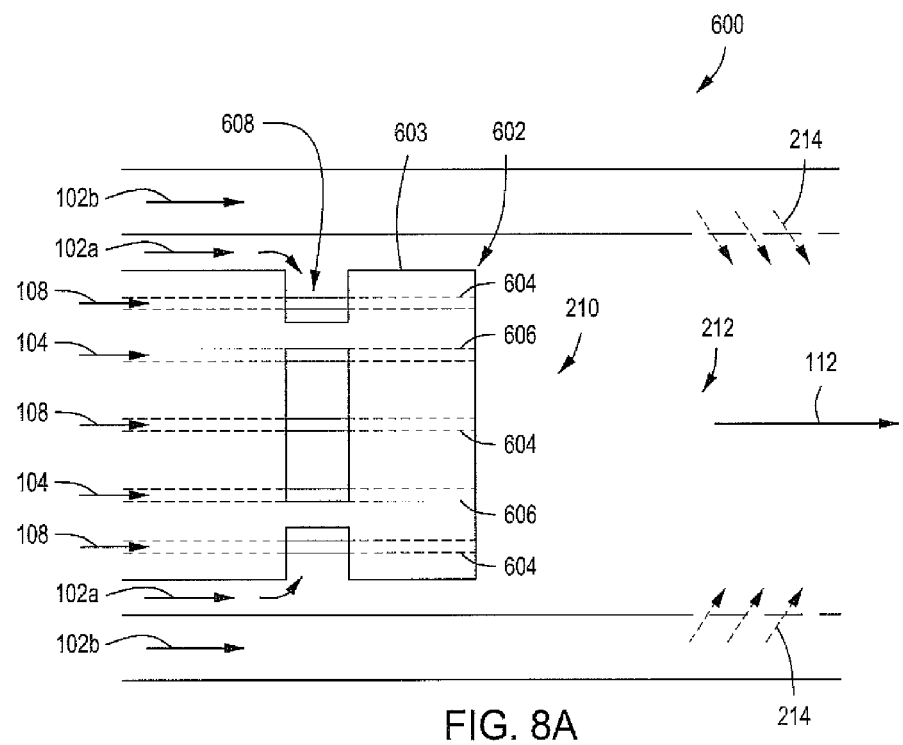
FIGS. 8A and 8B depict an illustrative tube-bundle type combustor configured to utilize one or more of the elements of the combustors depicted in FIGS. 4A-4C, according to one or more embodiments described.
Figure 8B:
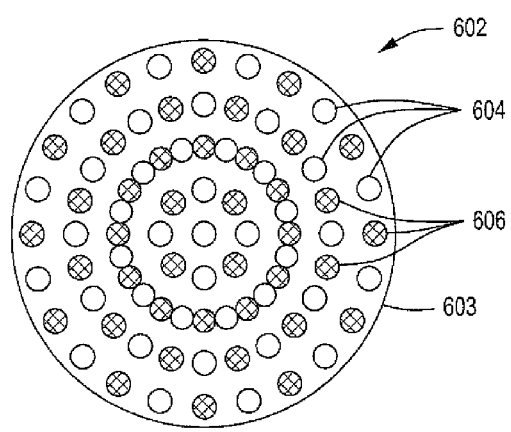

FIGS. 8A and 8B depict an illustrative tube-bundle type combustor 600 configured to utilize some elements of the combustors depicted in FIGS. 4A-4C, according to one or more embodiments. As such, FIGS. 8A and 8B may be best understood with reference to FIGS. 4A-4C. One particular design configuration of this combustor 600 is the burner assembly 602. The combustion burner 602 can include a central burner body 603 that includes a plurality of tubes 604, 606 in a bundled arrangement disposed within the central burner body 603. The plurality of bundled tubes can be in an array of alternating combustion fuel injector tubes 604 and oxygen injector tubes 606. FIG. 8B depicts a cross-sectional view of the burner assembly 602 showing one configuration of the plurality of tubes 604, 606 in a bundled arrangement. One or more openings 608 can be disposed through a side of the central burner body 603 that allows for some carbon dioxide from the carbon dioxide stream 102a to enter the combustion burner 602. The carbon dioxide can flow between and around the bundled combustion fuel and oxygen injector tubes 604 and 606, respectively, and exit the combustion burner 602 axially. The size of the burner assembly 602 along with the number, size, and arrangement of the fuel and oxygen injector tubes 604, 606, respectively, can be varied depending on the specific requirements of the combustor 600.

The close proximity of the injector tubes 604, 606, with respect to one another, can provide for efficient mixing between the combustion fuel introduced via line 108 and the oxygen introduced via line 104. The close proximity of the injector tubes 604, 606, with respect to one another, can also provide a reliable and predictable variation of the mixture fraction across the face of the combustion burner 602. The combustor 600 can be designed to allow for the combustion fuel 108 and oxygen 104 flow rates through the injector tubes 604, 606, respectively, to be modulated independently. Independent modulation of the combustion fuel 108 and the oxygen 104 can provide a high degree of control over the mixture fraction across the face of the combustion burner 602.

The bundling of the combustion fuel and oxygen injector tubes 604, 606, respectively, can also improve combustion of the combustion fuel 108 and oxygen 104 introduced into the combustor 600. The bundling of the combustion fuel and oxygen injector tubes 604, 606, respectively, can also reduce a loss of the combustion fuel 108 and oxygen 104 to the co-flowing carbon dioxide stream 102a. The carbon dioxide 102a flowing between the injector tubes 604, 606 can act as a diluent or cooling stream, help manage temperature requirements, and/or the flow of the carbon dioxide 102a could be designed to create a hot pilot zone in the middle of the bundle. Similar to cooling holes in combustor liners 203 (discussed and described above), the side openings 608 on the side of the combustion burner 602 can be changed in size to adjust the flow rate of carbon dioxide through the combustion burner 602.

Figure 9:
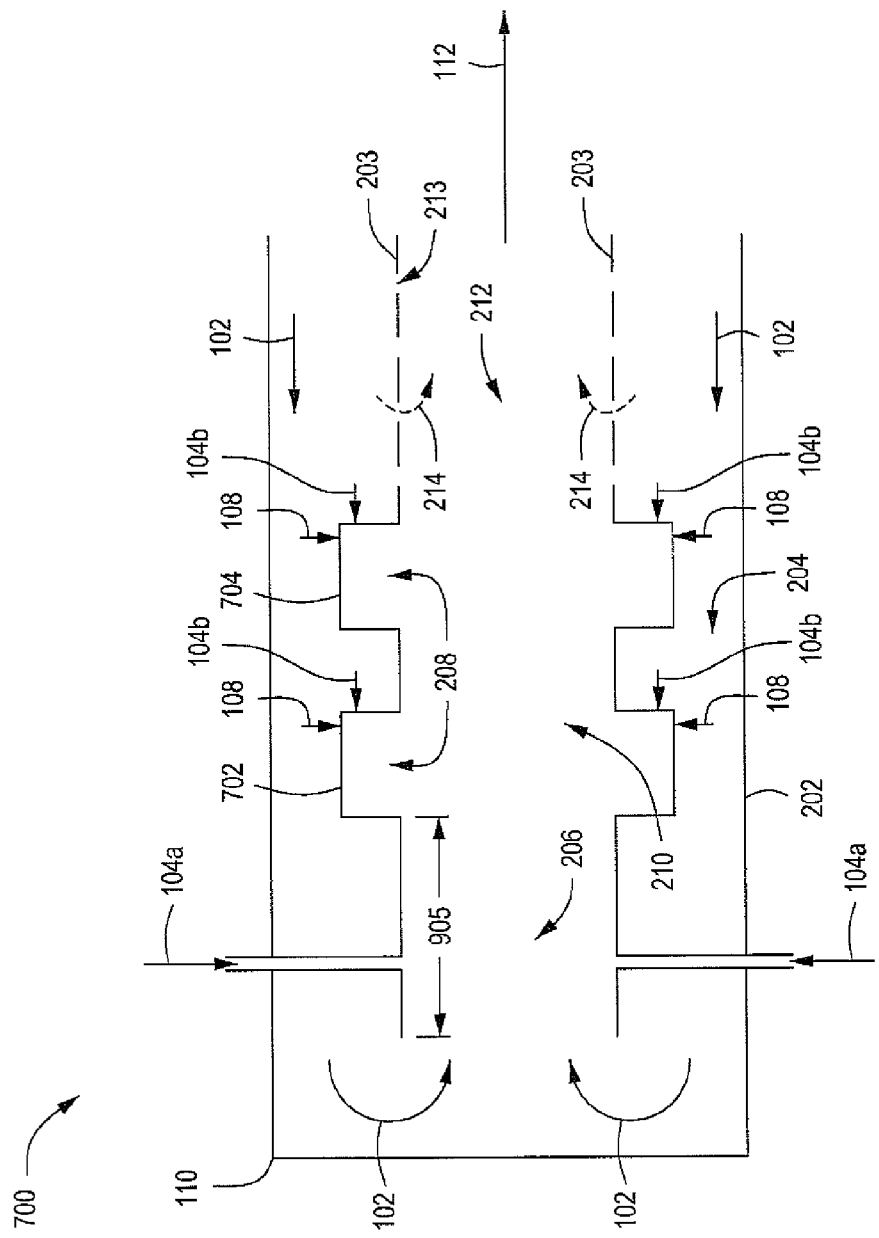
FIG. 9 depicts an illustrative trapped vortex type combustor configured to utilize one or more of the elements of the combustors depicted in FIGS. 4A-4C, according to one or more embodiments described.

FIG. 9 depicts an illustrative trapped vortex type combustor 700 configured to utilize one or more of the elements of the combustor systems 200, 220, 240 depicted in FIGS. 4A-4C, respectively, according to one or more embodiments. As such, FIG. 9 can be best understood with reference to FIGS. 4A-4C. The combustor 700 can include one or more cavities (two are shown 702, 704) disposed within the combustion liner 203. The cavities 702, 704 can extend into the annulus 204 disposed between the combustion liner 203 and the outer shell 202 of the combustor 700.

The carbon dioxide stream via line 102 can be routed along the walls of the combustor 700 and directed into the first mixing zone 206. Openings or holes 213 can be sized for the combustor 700 and can allow for a portion of the carbon dioxide stream 102 to enter the combustor downstream of the combustion zone 210 indicated via lines 214 and dilute the combustion products within the burnout zone 212 and cool the combustion liner 203. The carbon dioxide that does not enter the openings or holes 213 can flow through the annulus 204 and along the back of the cavity or cavities 702, 704 thereby cooling them. Although not shown, the backside of the cavity or cavities 702, 704 can also include cooling fins or other modifications that can increase the surface area thereof for more efficient cooling of the cavities 702, 704 if required for a specific combustor. This design serves the dual role of not only reducing the temperature of the wall of the cavities 702 and 704, but can also preheat the carbon dioxide stream 102.

The oxygen supply stream 104a can be injected into the carbon dioxide stream 102 within the combustion liner 203 upstream of the cavities 702 and 704. The oxygen supply stream 104a can mix with the carbon dioxide stream 102 in the first mixing zone 206 to form the oxygenation or synair stream. Note that FIG. 9 depicts a series of two cavities 702 and 704 for illustration purposes only. The combustor 700 can include a single cavity, two cavities 702, 704, or three or more cavities without departing from the scope of the disclosure. Each cavity 702 and 704 can include one or more injection locations for either the combustion fuel stream 108, a secondary oxygen supply stream 104b, or a mixture of the combustion fuel stream and the secondary oxygen supply stream. The injection locations can also be varied in the cavity to match the requirements of the combustor 700. In this configuration, each cavity operates independently and the flow rates of the combustion fuel supply stream 108 and secondary oxygen supply stream 104b can be modulated independently in each cavity 702 and 704. This allows for a much wider operating envelope. The flames exist stably either in the cavity 702, 704 or just at the entrance of the cavity 702, 704 aided by the reduced velocities and recirculation zone(s) in the cavity 702, 704. The trapped vortex combustor 700 can also include a long optical path length 905 to allow efficient preheating of the carbon dioxide stream 102 and therefore the synair stream. An advantage of the trapped vortex combustor 700 over traditional gas turbine combustors is the greatly reduced pressure drop. There are minimal blockages to the carbon dioxide stream 102 which results in a reduced loss in carbon dioxide pressure.

FIGS. 10A and 10B depict illustrative flow charts of methods for operating one or more of the combustors depicted in FIGS. 4A-9, according to one or more embodiments. As such, FIGS. 10A and 10B can be best understood with reference to FIGS. 4A-9. The method 800 can include mixing 804 an oxygen supply stream and at least a portion of a carbon dioxide stream in a first mixing zone to form a first mixture comprising oxygen and carbon dioxide, i.e., an "oxygenation stream" or "synair stream." The method 800 can also include mixing 806 the first mixture and a combustion fuel stream in a second mixing zone to form a mixed combustion stream. The mixed combustion stream can be at least partially combusted 808 to form a combustion products stream. As depicted in FIG. 10B, the method 820 can include varying 824 a spatial ratio of oxygen-to-carbon dioxide across a burner face of a combustor to increase flame stability in the combustor.

Referring again to FIGS. 4A-4C, the burnout zone 212 of the combustor 110 can include at least one of a passive dilution zone 218 having a series of holes disposed through the combustion liner 203 configured to cool and quench the combustion liner 203 of the combustor 110; an active dilution zone (not shown) having at least one quench port configured to actively deliver at least a portion of the second portion of the carbon dioxide stream 102b to the combustor 110 to mix with the combustion products stream 112; a series of staged quench ports (not shown) to actively control a temperature pattern through the burnout zone 212; and any combination thereof. In one or more embodiments, the burnout zone 212 can also include a sensor 216, such as a pressure transducer, to monitor, measure and/or estimate pressure oscillations within the combustor 110, which can be a sign of flame blowout. An oxygen analyzer (not shown) can also be included in the combustor 110 to provide another input to the oxygen feedback loop.

In terms of heating value, the oxygenation stream 106 can have no heating value, the combustion fuel stream 108 can have a relatively high value (e.g., from at about 500 British thermal units per standard cubic foot (BTU/scf) to about 950 BTU/scf).

During operation, the combustion zone 210 can produce temperatures of from about 1,500° C. to about 2,200° C. With the addition of the carbon dioxide stream 102b, the combustion products stream 112 is expected to range from about 1,000° C. up to about 1,400° C. as the combustion products stream enters the burnout zone 212. Additional quench gas 102b can be introduced via the outer wall of the burnout zone 212 generating a sort of "gas envelope" to keep the wall of the combustor 110 cooler than the hot flame zone 211. In one exemplary embodiment, the cooling stream 102b can be stripped of hydrocarbons to minimize soot formation, if necessary. In another exemplary embodiment, the combustion takes place at higher than atmospheric pressure, such as above about 10 atmospheres.

EXAMPLES

Some exemplary gas stream compositions are provided in the tables below as examples of gas streams at different stages of production in a single gas production field, or different gas production fields. Table 1 provides specific stream compositions and flow rates for a production well at or near the beginning of production.

TABLE 1

| | Start-up | | | | |
|---|---|---|---|---|---|
| Component | Stream 104 | Stream 108b | Stream 108a | Stream 102a | Stream 112 |
| $O_2$ | 95.59% | 0 | 0 | 0 | 0.44% |
| $CO_2$ | 0 | 0 | 0 | 76.23% | 61.83% |
| $CH_4$ | 0 | 0 | 100% | 0 | 0.00% |
| CO | 0 | 0 | 0 | 0 | 0.85% |
| OH | 0 | 0 | 0 | 0 | 0.12% |
| $H_2$ | 0 | 0 | 0 | 0 | 0.09% |
| $H_2O$ | 0 | 0 | 0 | 16.99% | 30.42% |
| Ar | 4.26% | 0 | 0 | 6.78% | 6.34% |
| Misc | 0.15% | 0 | 0 | 0 | 0% |
| Total | 100.00% | 0.00% | 100.00% | 100.00% | 100.09% |
| Pressure (psig) | 300 | 300 | 300 | 300 | 250 |
| Temp (° F.) | 755 | 500 | 160 | 540 | 1701.7 |
| LB Moles | 13474.1 | 0 | 6464.1 | 143860 | 163798 |
| Flow (lb/hr) | 436010 | 0 | 103425 | 6282874 | 6822309 |

Table 2 provides specific stream compositions and flow rates for a production well after $CO_2$ breakthrough.

TABLE 2

| | Post Breakthrough | | | | |
|---|---|---|---|---|---|
| Component | Stream 104 | Stream 108b | Stream 108a | Stream 102a | Stream 112 |
| $O_2$ | 95.59% | 0 | 0 | 0 | 0.01% |
| $CO_2$ | 0 | 88.16% | 0 | 0 | 64.15% |
| $CH_4$ | 0 | 5.21% | 100% | 0 | 0.00% |
| $C_2$ | 0 | 2.76% | 0 | 0 | 0.00% |
| $C_3$ | 0 | 1.25% | 0 | 0 | 0.00% |
| CO | 0 | 0% | 0 | 0 | 0.03% |
| OH | 0 | 0% | 0 | 0 | 0.00% |
| $H_2$ | 0 | 0% | 0 | 0 | 0.24% |
| $H_2O$ | 0 | 0% | 0 | 0 | 31.02% |
| $N_2$ | 0 | 1% | 0 | 0 | 0.84% |
| Ar | 4.26% | 0 | 0 | 0 | 0.40% |
| Misc | 0.15% | 1.77% | 0 | 0 | 3.30% |
| Total | 100.00% | 100.00% | 100.00% | 0.00% | 100.00% |
| Pressure (psig) | 300 | 300 | 300 | 300 | 250 |
| Temp (° F.) | 755 | 500 | 160 | 540 | 1701.7 |
| LB Moles | 13474.1 | 136740 | 171.8 | 0 | 150386 |
| Flow (lb/hr) | 412653 | 5639146 | 2748 | 0 | 6054547 |

Embodiments of the present invention further relate to any one or more of the following paragraphs:

1. A combustor system, comprising: a combustor having a first end, a second end, an outer shell, an inner shell, and an annular volume formed between the outer shell and the inner shell extending from the first end to the second end; a carbon dioxide inlet configured to introduce carbon dioxide to the combustor; an oxygen inlet configured to introduce oxygen to the combustor; a first mixing zone configured to mix a first portion of any carbon dioxide introduced through the carbon dioxide inlet with at least a portion of any oxygen introduced through the oxygen inlet to produce a first mixture comprising oxygen and carbon dioxide; a fuel inlet configured to introduce a fuel to the combustor; a second mixing zone configured to mix the first mixture and the fuel to produce a second mixture comprising oxygen, carbon dioxide, and fuel; and a combustion zone configured to combust the second mixture to produce a combustion product, wherein a second portion of any carbon dioxide introduced through the carbon dioxide inlet flows through one or more apertures disposed through the inner shell and mixes with and cools the combustion product.

2. The system according to paragraph 1, wherein the first portion of any carbon dioxide introduced through the carbon dioxide inlet flows through the annular volume of the combustor toward the first end of the combustor from the second end of the combustor, wherein the oxygen inlet is positioned in the annular volume at a distance from the first end of the combustor configured to promote mixing of the first portion of any carbon dioxide introduced through the carbon dioxide inlet and the oxygen introduced through the oxygen inlet, and wherein the fuel is introduced into the first end of the combustor.

3. The system according to paragraph 2, wherein the oxygen inlet comprises a plurality of injector holes disposed through at least one of a wall of the combustor and a ring in the annular volume.

4. The system according to paragraph 2, further comprising a secondary inner shell configured to prevent introduction of the oxygen introduced through the oxygen inlet through the inner shell, wherein the first mixing zone is positioned at a distance from the first end of the combustor and configured to promote mixing of the oxygen introduced through the oxygen inlet and the first portion of any carbon dioxide introduced through the carbon dioxide inlet.

5. The system according to paragraph 1, wherein the oxygen inlet is positioned at the first end of the combustor, wherein the fuel is introduced into the first end of the combustor, and wherein a flow of the first mixture is from the first end of the combustor to the second end of the combustor.

6. The system according to paragraph 5, further comprising a plurality of burners configured to perform a function selected from the group consisting of: introduce at least a portion of the oxygen introduced through the oxygen inlet to the second mixing zone, introduce the fuel to the second mixing zone, introduce at least a portion of the oxygen introduced through the oxygen inlet to the first mixing zone, and any combination thereof.

7. The system according to paragraph 6, wherein any one or a portion of the plurality of burners is configured to be turned off to control a load of the combustor and generate a different oxygen-to-carbon dioxide ratio in each burner.

8. The system according to any one of paragraphs 2, 4, and 6, wherein the first mixture comprises a spatially varied ratio of oxygen-to-carbon dioxide configured to generate a hot zone in a portion of the combustion zone to increase flame stability therein.

9. The system according to paragraph 8, further comprising at least one secondary oxygen inlet configured to spatially vary the ratio of oxygen-to-carbon dioxide in the first mixture.

10. The system according to paragraph 8, further comprising a variable geometry mixing device positioned in the first mixing zone configured to spatially vary the ratio of oxygen-to-carbon dioxide in the first mixture.

11. The system according to any one of paragraphs 2, 4, and 6, further comprising a gas inlet configured to provide an anchor flame upstream of the combustion zone to increase flame stability in the combustion zone.

12. The system according to any one of paragraphs 2, 4, and 6, further comprising: a mixing device positioned in the first mixing zone configured to enhance the mixing of the first mixture; and a second mixing device positioned in the second mixing zone configured to create a low velocity region to increase flame stability in the combustion zone.

13. The system according to paragraph 1, wherein the first mixing zone comprises a swirl inducer configured to introduce the oxygen into the carbon dioxide at an angle tangential to a flow path of the first portion of any carbon dioxide introduced through the carbon dioxide inlet to generate a swirling first mixture.

14. The system according to paragraph 1, further comprising: at least one cavity positioned in the second mixing zone configured to deliver at least a portion of the fuel to the combustion zone to produce a low-velocity region to enhance flame stability in the combustion zone, wherein the first portion of any carbon dioxide introduced through the carbon dioxide inlet flows through the annular volume of the combustor toward the first end of the combustor from the second end of the combustor to cool a wall of the at least one cavity, and wherein the first mixing zone is located near the first end of the combustor.

15. The system according to paragraph 14, further comprising at least one secondary oxygen inlet in the at least one cavity to form a hot flame zone to increase flame stability in the combustion zone.

16. The system according to paragraph 9 or 11, further comprising a controller to actively control the spatial variation of the oxygen concentration by controlling the ratio of oxygen flow through two or more of the oxygen inlet, the at least one secondary oxygen inlet, and the gas inlet.

17. A combustion burner system, comprising: a combustor having a first end, a second end, an outer shell, an inner shell, a combustion burner comprising a burner face, and a combustion zone; a carbon dioxide inlet, an oxygen inlet, and a fuel inlet; and a mixing zone configured to mix a first portion of any carbon dioxide introduced through the carbon dioxide inlet and at least a portion of any oxygen introduced through the oxygen inlet to produce a first mixture comprising oxygen and carbon dioxide, wherein the first mixture comprises a spatially varied ratio of oxygen-to-carbon dioxide across the burner face configured to generate a hot zone in a combustion zone to increase flame stability in the combustion zone.

18. The system according to paragraph 17, wherein the hot zone is located substantially in the center of the combustion zone.

19. The system according to paragraph 18, further comprising at least one secondary oxygen inlet configured to spatially vary the ratio of oxygen-to-carbon dioxide in the first mixture.

20. The system according to paragraph 19, further comprising a controller to actively control the spatial variation of the oxygen-to-carbon dioxide ratio by controlling the ratio of oxygen flow through the oxygen inlet and the at least one secondary oxygen inlet.

21. The system according to paragraph 18, further comprising a variable geometry mixing device in the first mixing zone configured to spatially vary the ratio of oxygen-to-carbon dioxide.

22. The system according to paragraph 20, further comprising: an annular volume formed between the outer shell and the inner shell extending from the first end to the second end, wherein the first portion of any carbon dioxide introduced through the carbon dioxide inlet is configured to flow through the annular volume toward the first end of the combustor from the second end of the combustor, wherein the oxygen inlet is configured to deliver the oxygen introduced through the oxygen inlet to the first portion of any carbon dioxide introduced through the carbon dioxide inlet to produce the first mixture, and wherein the oxygen inlet is positioned in the annular volume at a distance from the first end of the combustor, wherein the distance is configured to promote mixing of the first mixture.

23. The system according to paragraph 22, wherein the oxygen inlet comprises a plurality of injector holes disposed through at least one of a wall of the combustor and a ring in the annular volume.

24. The system according to paragraph 23, further comprising a secondary inner shell configured to prevent introduction of the oxygen through the inner shell, wherein the oxygen inlet is positioned at a distance from the first end of the combustor and configured to promote mixing of the first mixture.

25. The system according to any one of paragraphs 20 and 21, wherein the oxygen inlet and the fuel inlet are positioned at the first end of the combustor and a flow of the first mixture is from the first end of the combustor to the second end of the combustor.

26. The system according to paragraph 17, wherein the combustion burner further comprises: a central burner body having a plurality of tubes in a bundled arrangement disposed therein, wherein a first portion of the plurality of tubes are configured to carry the fuel and a second portion of the plurality tubes are configured to carry the oxygen; an opening disposed through at least a portion of a side of the central burner body configured to permit the passage of the first portion of any carbon dioxide into a volume disposed between the plurality of tubes; and a controller configured to modulate at least a flow rate of the oxygen across the second portion of the tubes configured to carry the oxygen to spatially vary the ratio of oxygen-to-carbon dioxide across the burner face.

27. The system according to any one of paragraphs 17, 22, 25, and 26, further comprising a gas injection device configured to provide an anchor flame upstream of the combustion zone, the anchor flame being adapted to increase flame stability in the combustion zone.

28. A method for combusting a fuel in a combustion system, comprising: mixing oxygen and carbon dioxide in a first mixing zone of a combustor to produce a first mixture; mixing the first mixture and a fuel in a second mixing zone of the combustor to produce a second mixture; and combusting at least a portion of the fuel in the second mixture to produce a combustion product.

29. The method of paragraph 28, further comprising applying the method of claim 28 to the combustor system of any one of claims 2, 4, 6, 13, and 14.

30. A method for combusting a fuel in a combustion system, comprising: varying a spatial ratio of oxygen-to-carbon dioxide across a burner face of a combustor to increase flame stability in the combustor.

31. The method according to paragraph 30, further comprising applying the method of claim 30 to the combustor systems of any one of claims 17, 22, 25, and 26.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A combustor system, comprising:
   a combustor having a first end, a second end, an outer shell, an inner shell, a secondary inner shell, and an annular volume formed between the outer shell and the inner shell extending from the first end to the second end;
   a carbon dioxide inlet configured to introduce carbon dioxide to the combustor;
   an oxygen inlet configured to introduce oxygen to the combustor;
   a first mixing zone disposed within the combustor and configured to mix a first portion of any carbon dioxide introduced through the carbon dioxide inlet with at least a portion of any oxygen introduced through the oxygen inlet to produce a first mixture within the first mixing zone comprising oxygen and carbon dioxide, wherein:
      the first portion of any carbon dioxide introduced through the carbon dioxide inlet flows through the annular volume of the combustor toward the first end of the combustor from the second end of the combustor,
      the oxygen inlet is positioned in the annular volume and configured to promote mixing of the first portion of any carbon dioxide introduced through the carbon dioxide inlet and the oxygen introduced through the oxygen inlet, and
      the secondary inner shell is configured to prevent introduction of the oxygen introduced through the oxygen inlet through the inner shell;
   a fuel inlet configured to introduce a fuel into the first end of the combustor;
   a second mixing zone disposed within the combustor and configured to mix the first mixture and the fuel to produce a second mixture within the second mixing zone comprising oxygen, carbon dioxide, and fuel; and
   a combustion zone configured to combust the second mixture to produce a combustion product, wherein a second portion of any carbon dioxide introduced through the carbon dioxide inlet flows through one or more apertures disposed through the inner shell and mixes with and cools the combustion product.

2. The system of claim 1, wherein:
   the fuel is introduced into the first end of the combustor.

3. The system of claim 2, further comprising a secondary oxygen inlet configured to introduce oxygen to the second mixing zone.

4. The system of claim 1, further comprising at least one secondary oxygen inlet configured to spatially vary a ratio of oxygen-to-carbon dioxide in the first mixture.

5. The system of claim 4, further comprising a controller to actively control the spatial variation of the oxygen concentration by controlling the ratio of oxygen flow through the oxygen inlet and the at least one secondary oxygen inlet.

6. The system of claim 1, further comprising a variable geometry mixing device positioned in the first mixing zone configured to spatially vary a ratio of oxygen-to-carbon dioxide in the first mixture.

7. The system of claim 1, further comprising:
   at least one cavity positioned in the second mixing zone configured to deliver at least a portion of the fuel to the combustion zone to produce a low-velocity region to enhance flame stability in the combustion zone, wherein the first portion of any carbon dioxide introduced through the carbon dioxide inlet flows through the annular volume of the combustor toward the first end of the combustor from the second end of the combustor to cool a wall of the at least one cavity, and wherein the first mixing zone is located near the first end of the combustor.

8. A combustion burner system, comprising:
a combustor having a first end, a second end, an outer shell, an inner shell, a secondary inner shell, an annular volume formed between the outer shell and the inner shell extending from the first end to the second end, a combustion burner comprising a burner face, and a combustion zone;
a carbon dioxide inlet, an oxygen inlet, and a fuel inlet; and
a mixing zone disposed within the combustor and configured to mix a first portion of any carbon dioxide introduced through the carbon dioxide inlet and at least a portion of any oxygen introduced through the oxygen inlet to produce a first mixture within the mixing zone comprising oxygen and carbon dioxide, wherein:
the first portion of any carbon dioxide introduced through the carbon dioxide inlet is configured to flow through the annular volume toward the first end of the combustor from the second end of the combustor,
the oxygen inlet is configured to deliver the oxygen introduced through the oxygen inlet to the first portion of any carbon dioxide introduced through the carbon dioxide inlet to produce the first mixture,
the oxygen inlet is positioned in the annular volume and configured to promote mixing of the first portion of any carbon dioxide introduced through the carbon dioxide inlet and the oxygen introduced through the oxygen inlet,
the oxygen inlet comprises a plurality of injector holes disposed through at least one of a wall of the combustor and a ring in the annular volume,
the secondary inner shell is configured to prevent introduction of the oxygen through the inner shell, and
the first mixture comprises a spatially varied ratio of oxygen-to-carbon dioxide across the burner face configured to generate a hot zone in a combustion zone to increase flame stability in the combustion zone.

9. The system of claim 8, further comprising at least one secondary oxygen inlet configured to spatially vary the ratio of oxygen-to-carbon dioxide in the first mixture.

10. The system of claim 8, further comprising a variable geometry mixing device in the first mixing zone configured to spatially vary the ratio of oxygen-to-carbon dioxide.

11. The system of claim 8, further comprising a gas injection device configured to provide an anchor flame upstream of the combustion zone, the anchor flame being adapted to increase flame stability in the combustion zone.

12. A combustion burner system, comprising:
a combustor having a first end, a second end, an outer shell, an inner shell, a combustion burner comprising a burner face, and a combustion zone;
a carbon dioxide inlet, an oxygen inlet, and a fuel inlet;
a mixing zone disposed within the combustor and configured to mix a first portion of any carbon dioxide introduced through the carbon dioxide inlet and at least a portion of any oxygen introduced through the oxygen inlet to produce a first mixture within the mixing zone comprising oxygen and carbon dioxide, wherein the first mixture comprises a spatially varied ratio of oxygen-to-carbon dioxide across the burner face configured to generate a hot zone in a combustion zone to increase flame stability in the combustion zone;
a central burner body having a plurality of tubes in a bundled arrangement disposed therein, wherein a first portion of the plurality of tubes are configured to carry a fuel and a second portion of the plurality tubes are configured to carry the oxygen;
an opening disposed through at least a portion of a side of the central burner body configured to permit the passage of the first portion of any carbon dioxide into a volume disposed between the plurality of tubes; and
a controller configured to modulate at least a flow rate of the oxygen across the second portion of the tubes configured to carry the oxygen to spatially vary the ratio of oxygen-to-carbon dioxide across the burner face.

* * * * *